(12) United States Patent
Takahashi et al.

(10) Patent No.: US 10,091,757 B2
(45) Date of Patent: Oct. 2, 2018

(54) BASE-STATION CONTROL APPARATUS AND POSITION ESTIMATION METHOD

(71) Applicant: Panasonic Intellectual Property Corporation of America, Torrance, CA (US)

(72) Inventors: Hiroshi Takahashi, Kanagawa (JP); Naganori Shirakata, Kanagawa (JP); Tomoya Urushihara, Kanagawa (JP); Junichi Morita, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/897,938

(22) Filed: Feb. 15, 2018

(65) Prior Publication Data

US 2018/0242273 A1    Aug. 23, 2018

(30) Foreign Application Priority Data

Feb. 21, 2017   (JP) .................................. 2017-030029

(51) Int. Cl.
*H04W 64/00* (2009.01)
*H04W 4/02* (2018.01)
(Continued)

(52) U.S. Cl.
CPC ............. *H04W 64/003* (2013.01); *G01S 5/10* (2013.01); *H04B 17/27* (2015.01); *H04W 4/027* (2013.01); *H04W 48/20* (2013.01)

(58) Field of Classification Search
CPC ... H04W 64/003; H04W 4/027; H04W 48/20; H04W 64/00; H04W 64/006;
(Continued)

(56) References Cited

U.S. PATENT DOCUMENTS

| 2004/0127230 A1* | 7/2004 | Bevan | H04W 64/00 |
| | | | 455/456.5 |
| 2008/0020785 A1* | 1/2008 | Liu | G01S 5/12 |
| | | | 455/456.2 |

(Continued)

FOREIGN PATENT DOCUMENTS

JP    2011-149808 A    8/2011

*Primary Examiner* — Nathan Taylor
(74) *Attorney, Agent, or Firm* — Seed IP Law Group LLP

(57) ABSTRACT

A base-station control apparatus includes: a sub-anchor candidate selector that selects sub-anchor candidates from base-station apparatuses different from a first base-station apparatus connected to a wireless terminal; an arrival-direction estimator that estimates arrival direction vectors with respect to the first base-station apparatus and the candidates, based on reception qualities of signals that the first base-station apparatus and the candidates receives from the wireless terminal; a sub-anchor selector that selects a sub-anchor from the candidates, based on angles made by the estimated arrival direction vectors and line segments each having end points at positions of the first base-station apparatus and the corresponding candidate; and a position estimator that estimates a position of the wireless terminal, based on the arrival direction vectors with respect to the first base-station apparatus and the sub-anchor.

12 Claims, 22 Drawing Sheets

(51) Int. Cl.
*G01S 5/10* (2006.01)
*H04W 48/20* (2009.01)
*H04B 17/27* (2015.01)

(58) Field of Classification Search
CPC ..... H04W 16/28; H04W 24/10; H04W 4/025; H04W 72/04; H04W 72/046; H04W 84/18; H04B 17/27; G01S 5/10
USPC .......... 455/456.1, 456.2, 456.5, 63.4, 67.11; 370/335
See application file for complete search history.

(56) References Cited

U.S. PATENT DOCUMENTS

| | | | |
|---|---|---|---|
| 2010/0248637 A1* | 9/2010 | Sahinoglu | G01S 5/0289 455/67.11 |
| 2013/0182683 A1* | 7/2013 | Seol | H04W 72/04 370/335 |
| 2013/0231059 A1* | 9/2013 | Prasad | H04B 7/0695 455/63.4 |
| 2016/0069983 A1* | 3/2016 | Gonia | G01S 5/0205 455/456.1 |
| 2017/0374637 A1* | 12/2017 | Akkarakaran | H04B 7/0617 |
| 2018/0091947 A1* | 3/2018 | Shirakata | H04W 4/025 |

\* cited by examiner

FIG. 7

| BEAM PATTERN | ANGLE θ OF ARRIVAL DIRECTION |
|---|---|
| BEAM #1 | A1 |
| BEAM #2 | A2 |
| BEAM #3 | A3 |

FIG. 26

| BEAM PATTERN | RECEPTION QUALITY |
|---|---|
| BEAM #1 | 100 |
| BEAM #2 | 70 |
| BEAM #3 | 30 |
| BEAM #4 | 20 |
| BEAM #5 | 0 |
| BEAM #6 | 30 |
| BEAM #7 | 40 |
| BEAM #8 | 60 |

BASE-STATION CONTROL APPARATUS AND POSITION ESTIMATION METHOD

BACKGROUND

1. Technical Field

The present disclosure relates to a base-station control apparatus and a position estimation method that estimate the position of a wireless terminal.

2. Description of the Related Art

Japanese Unexamined Patent Application Publication No. 2011-149808 (hereinafter referred to as "Patent Document 1") discloses a cellular wireless position determination system in which position estimation (position determination) is performed between a plurality of wireless base-station apparatuses (wireless markers) arranged for respective cells or sectors and a wireless terminal (a mobile terminal) that is provided on a moving object or carried thereby.

SUMMARY

In Patent Document 1, however, wireless base-station apparatuses used for the position estimation are predetermined, and no disclosure is made of a method for selecting a wireless base-station apparatus used for the position estimation.

One non-limiting and exemplary embodiment provides a base-station control apparatus and a position estimation method that can improve the accuracy of estimating the position of a wireless terminal in a millimeter-wave wireless communications network.

In one general aspect, the techniques disclosed here feature a base-station control apparatus for controlling first to Mth base-station apparatuses (M is an integer greater than or equal to 2), the first base-station apparatus being connected to a wireless terminal. The base-station control apparatus includes: a sub-anchor candidate selector that selects, as one or more sub-anchor candidates, the second to Nth base-station apparatuses (N is an integer greater than or equal to 2 and is smaller than or equal to M) that are included in the second to Mth base-station apparatuses and that are present in a determined range from the first base-station apparatus; an arrival-direction estimator that obtains reception qualities of signals that the first base-station apparatus and the one or more sub-anchor candidates receive from the wireless terminal and that estimates, based on the reception qualities, an arrival direction vector with respect to the first base-station apparatus and one or more arrival direction vectors with respect to the respective one or more sub-anchor candidates; a sub-anchor selector that calculates one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates and that selects one or more sub-anchors from the one or more sub-anchor candidates based on a magnitude relationship of the one or more angles; and a position estimator that estimates a position of the wireless terminal. The arrival-direction estimator estimates a first arrival direction vector with respect to the first base-station apparatus and one or more second arrival direction vectors with respect to the selected one or more sub-anchors, and the position estimator estimates the position of the wireless terminal, based on the first arrival direction vector and the one or more second arrival direction vectors.

According to one aspect of the present disclosure, it is possible to improve the accuracy of estimating the position of a wireless terminal in a millimeter-wave wireless communications network.

It should be noted that general or specific embodiments may be implemented as a system, an apparatus, a device, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating one example of relationships between the beam patterns and angles of arrival directions in the first embodiment of the present disclosure;

FIG. 26 is a table illustrating one example of reception qualities for the respective beam patterns illustrated in FIG. 25;

DETAILED DESCRIPTION

Embodiments of the present disclosure will be described below in detail with reference to the accompanying drawings. The embodiments described below are examples, and the present disclosure is not limited to the following embodiments.

First Embodiment

<System Configuration>

Figure 1:
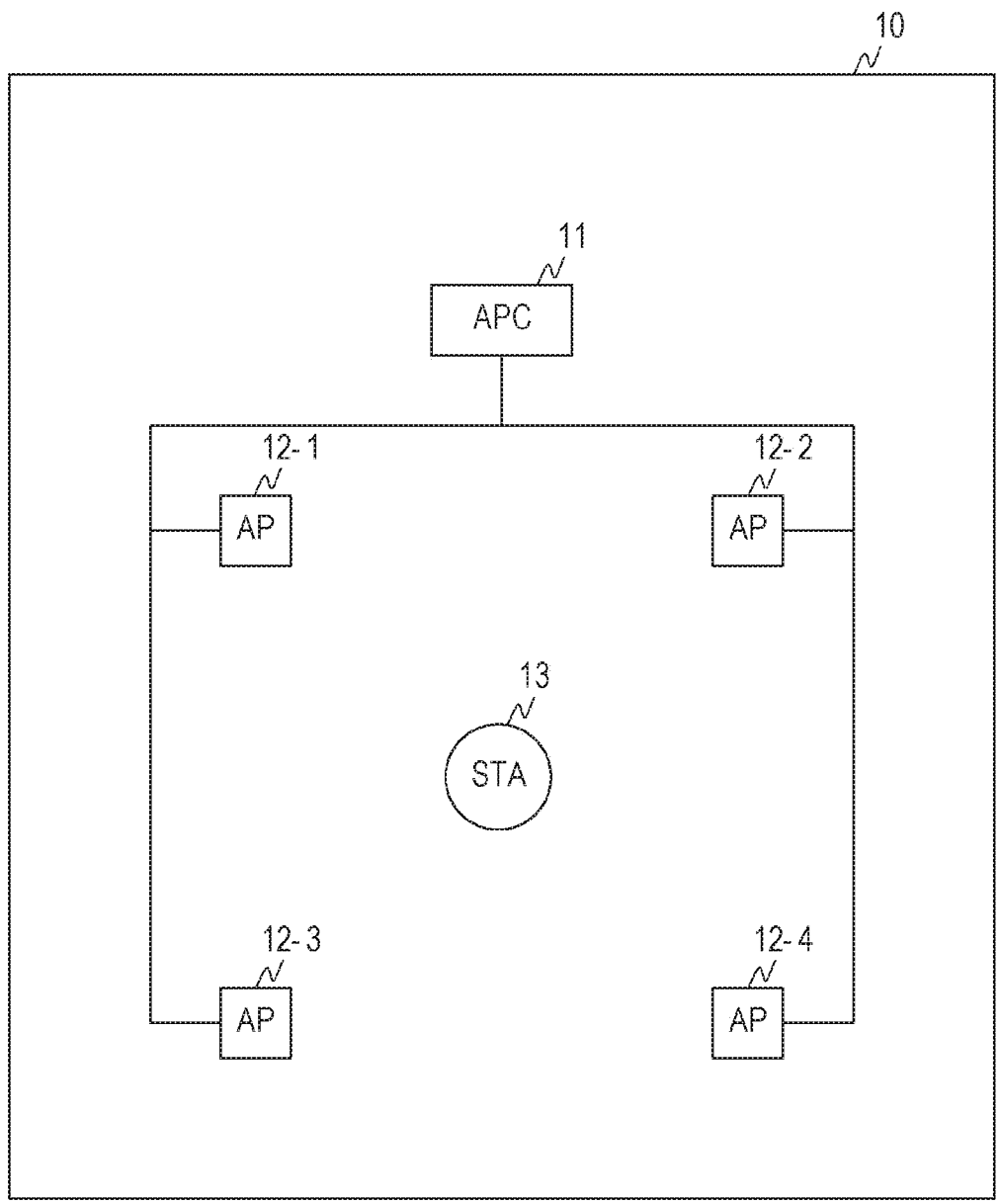
FIG. 1 is a diagram illustrating one example of a position estimating system according to a first embodiment of the present disclosure.

FIG. 1 is a diagram illustrating one example of a position estimating system 10 according to a first embodiment. The position estimating system 10 illustrated in FIG. 1 includes an access point controller (APC) 11, access points (AP) 12-1 to AP 12-4, and a wireless terminal (STA: wireless station) 13.

The APC 11 may be an apparatus called a wireless-base-station control apparatus, a base-station control apparatus, or the like. The APs 12-1 to 12-4 may also be an apparatus called a wireless base-station apparatus, a base-station apparatus, or the like.

The APC 11 are connected to the APs 12-1 to 12-4 through wired communication or wireless communication. The APC 11 controls and manages the APs 12-1 to 12-4. The APs 12-1 to 12-4 and the STA 13 are wireless communication apparatuses that operate in accordance with IEEE 802.11ad, which is a millimeter wave communication standard. The description below will be given of one example in which the STA 13 is wirelessly connected to the AP 12-4.

In the description below, an AP that is wirelessly connected to the STA 13 is referred to as a "main anchor". In addition to the main anchor, an AP that is used to estimate the position of the STA 13 is referred to as a "sub-anchor". That is, in the following example, the AP 12-4 is the main anchor.

<Configuration of APC 11>

Figure 2:
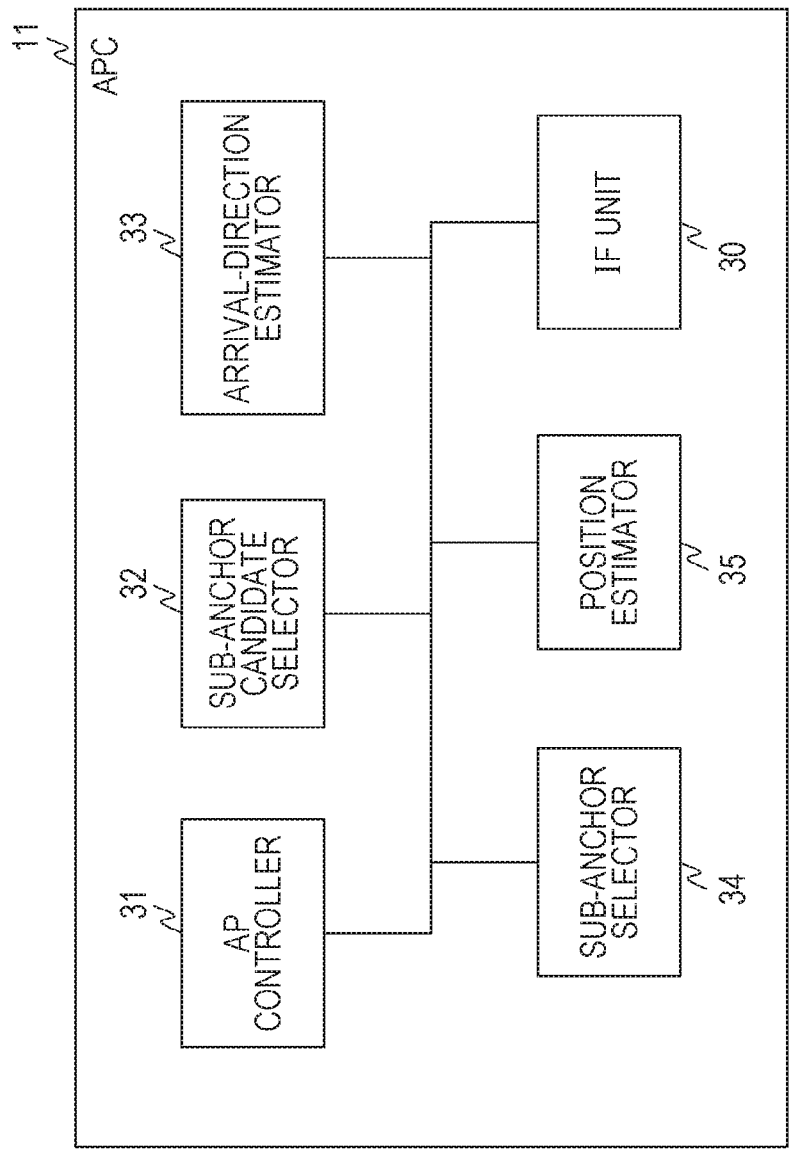
FIG. 2 is a diagram illustrating one example of the configuration of an APC according to the first embodiment of the present disclosure.

FIG. 2 is a diagram illustrating one example of the configuration of the APC 11 according to the first embodiment. The APC 11 includes an interface (IF) unit (IF circuit) 30, an AP controller (AP control circuit) 31, a sub-anchor candidate selector (a sub-anchor candidate selection circuit) 32, an arrival-direction estimator (an arrival-direction estimation circuit) 33, a sub-anchor selector (a sub-anchor selection circuit) 34, and a position estimator (a position estimation circuit) 35.

The IF unit 30 serves as an interface for performing wireless communication connection or wired communication connection between the APs 12-1 to 12-4 and the APC 11. The IF unit 30 performs format conversion between signals to be exchanged between the APC 11 and the APs (the APs 12-1 to 12-4) and/or performs connection protocol processing therebetween.

The AP controller 31 controls a beam selection protocol for the APs 12-1 to 12-4. The AP controller 31 also controls, for example, power supply management and band management of the APs 12-1 to 12-4. Details of the beam selection protocol are described later.

The sub-anchor candidate selector 32 selects candidates for an AP (i.e., a sub-anchor) that is included in the APs (APs 12-1 to 12-3) other than the AP 12-4 connected to the STA 13 and is to be used for estimating the position of the STA 13. For example, on the basis of pre-known position information of each AP, the sub-anchor candidate selector 32 selects, as sub-anchor candidates, APs that are present in a determined range from the AP 12-4, which is the main anchor.

The arrival-direction estimator 33 estimates an arrival direction vector of signals that each AP receives from the STA 13 (this arrival direction vector is hereinafter referred to as an "arrival direction vector of the STA 13"). For example, the arrival-direction estimator 33 estimates the arrival direction vector of the STA 13 on the basis of a result of the beam selection protocol executed between each AP and the STA 13. For example, the arrival-direction estimator 33 obtains the reception qualities of signals that the AP 12-4 receives from the STA 13, the reception qualities being obtained as a result of the beam selection protocol executed between the AP 12-4 and the STA 13, and then, on the basis of the reception qualities, the arrival-direction estimator 33 estimates the arrival direction vector of the STA 13 with respect to the AP 12-4. Details of a method for the arrival direction estimation is described later.

The sub-anchor selector 34 determines the angles between the known positions of APs and the arrival direction estimated by the arrival-direction estimator 33, and, on the basis of the determined angles the sub-anchor selector 34 selects, from the sub-anchor candidates, a sub-anchor to be used for position estimation.

The position estimator 35 estimates the position of the STA 13 on the basis of the arrival direction vector of the STA 13 with respect to the AP 12-4, which is the main anchor, and the arrival direction vectors of the STA 13 with respect to the APs that are sub-anchors selected by the sub-anchor selector 34.

<Configuration of APs>

Figure 3:
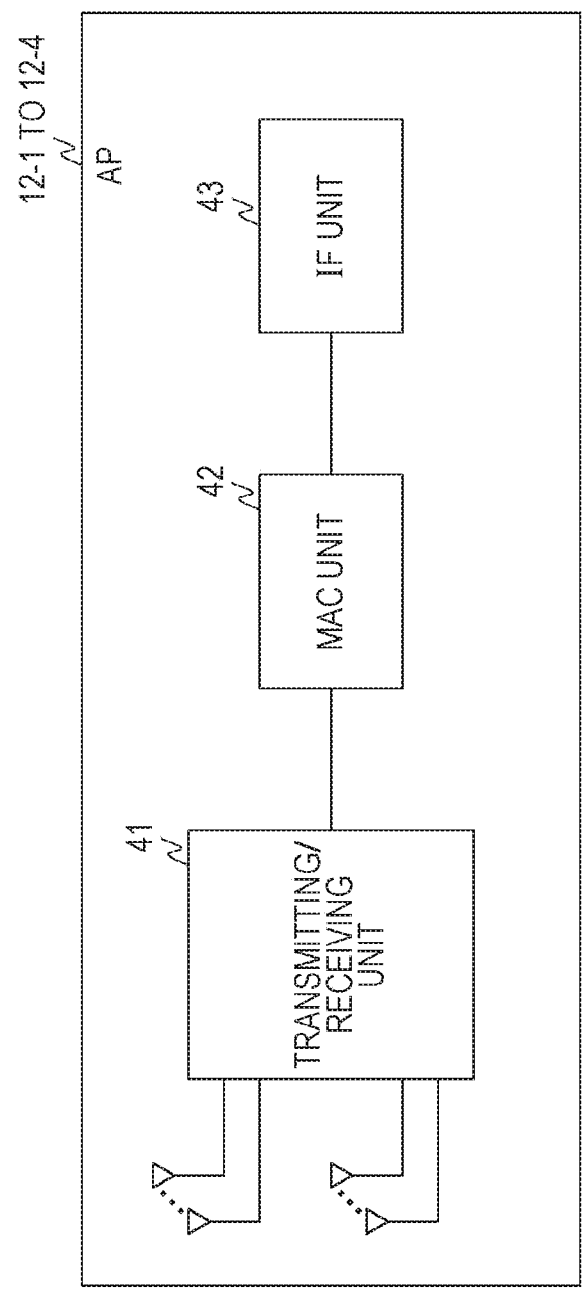
FIG. 3 is a diagram illustrating one example of the configuration of APs according to the first embodiment of the present disclosure.

FIG. 3 is a diagram illustrating one example of the configuration of the APs 12-1 to 12-4 according to the first embodiment. Each of the APs 12-1 to 12-4 includes a transmitting/receiving unit (a transmitting/receiving circuit) 41, a media access control (MAC) unit (MAC circuit) 42, and an IF unit 43.

The transmitting/receiving unit 41 has a transmit-and-receive array antenna whose beam pattern can be changed. The transmitting/receiving unit 41 performs signal transmission processing and signal reception processing. The signal transmission processing includes, for example, modulation processing, frequency conversion processing, and electric-power amplification processing. The signal reception processing includes, for example, demodulation processing, frequency conversion processing, and electric-power amplification processing. Since communication in the present embodiment is predicated on half-duplex communication, the transmitting/receiving unit 41 executes at least one of the transmission processing and the reception processing.

Upon receiving an instruction (e.g., a notification indicating start of the beam selection protocol) from the APC 11, the MAC unit 42 performs control for the beam selection protocol. Also, the MAC unit 42 performs wireless protocol control defined by IEEE802.11ad. Examples of the wireless protocol control include management of connection with a wireless terminal (e.g., the STA 13) and band limitation during data communication.

The IF unit 43 serves as an interface for performing wireless communication connection or wired communication connection with the APC 11. The IF unit 43 performs format conversion of signals to be exchanged with the APC 11 and/or connection protocol processing therewith.
<Configuration of STA>

Figure 4:
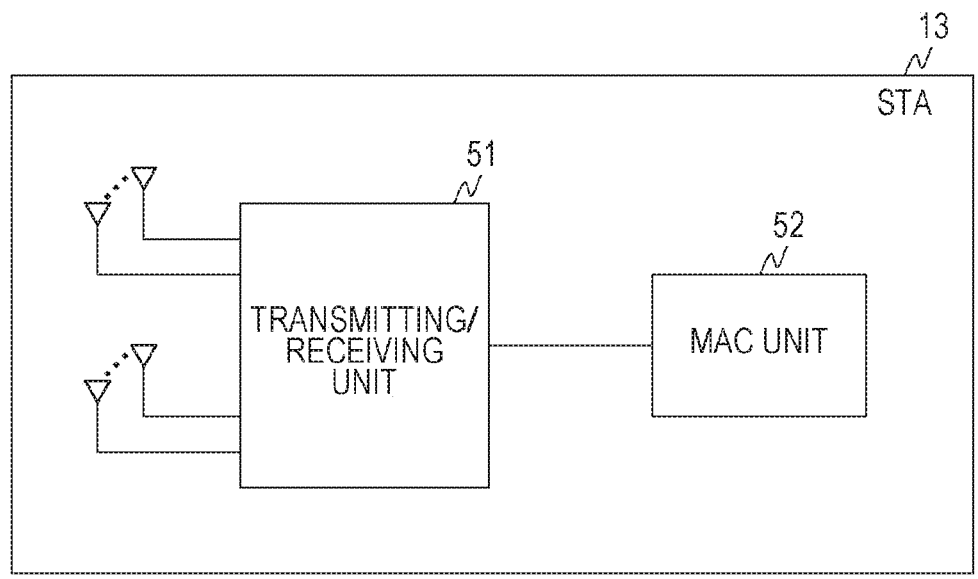
FIG. 4 is a diagram illustrating one example of the configuration of an STA according to the first embodiment of the present disclosure.

FIG. 4 is a diagram illustrating one example of the configuration of the STA 13 according to the first embodiment. The STA 13 includes a transmitting/receiving unit 51 and a MAC unit 52.

The transmitting/receiving unit 51 has a transmit-and-receive array antenna whose beam pattern can be changed. The transmitting/receiving unit 51 performs signal transmission processing and signal reception processing. The signal transmission processing includes, for example, modulation processing, frequency conversion processing, and electric-power amplification processing. The signal reception processing includes, for example, demodulation processing, frequency conversion processing, and electric-power amplification processing. Since communication in the present embodiment is predicated on half-duplex communication, the transmitting/receiving unit 51 executes at least one of the transmission processing and the reception processing.

The MAC unit 52 performs control for a beam selection protocol. The MAC unit 52 also performs wireless protocol control defined by IEEE802.11ad. Examples of the wireless protocol control include management of connection with an AP (e.g., the AP 12-4) and transmission/reception period control during data communication.
<Example of Beam Patterns>

Figure 5:
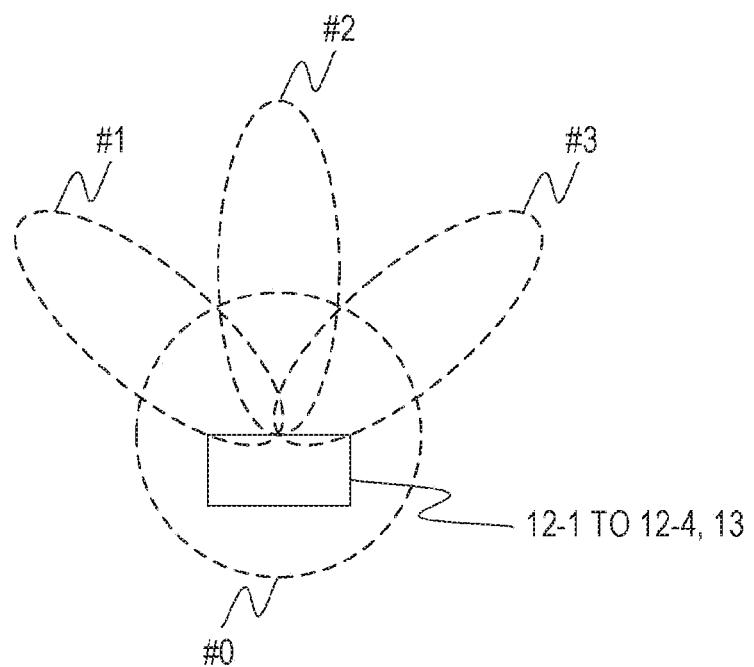
FIG. 5 illustrates one example of beam patterns in the first embodiment of the present disclosure.

As described above, each of the APs 12-1 to 12-4 and the STA 13 has a plurality of beam patterns. One example of the plurality of beam patterns will be described below. FIG. 5 illustrates one example of the beam patterns in the first embodiment.

In the example illustrated in FIG. 5, each of the APs 12-1 to 12-4 and the STA 13 has four types of beam pattern. In FIG. 5, the four types of beam pattern include directional beam patterns and an omnidirectional beam patter. Beams #1 to #3 are directional beam patterns, and beam #0 is an omnidirectional beam pattern.

Each of the APs 12-1 to 12-4 performs communication using the array antenna of the transmitting/receiving unit 41 to form one of the four types of beam patter. Similarly, the STA 13 performs communication by using the array antenna of the transmitting/receiving unit 51 to form one of four types of beam pattern.

The beam pattern formed for a communication is determined upon execution of a beam selection protocol between each AP and the STA.

In the description below, the numerals (#0 to #3 in the example illustrated in FIG. 5) given to the beams are referred to as "beam IDs". Also, #0 is the beam ID of the omnidirectional beam pattern.
<Beam Selection Protocol>

Figure 6:
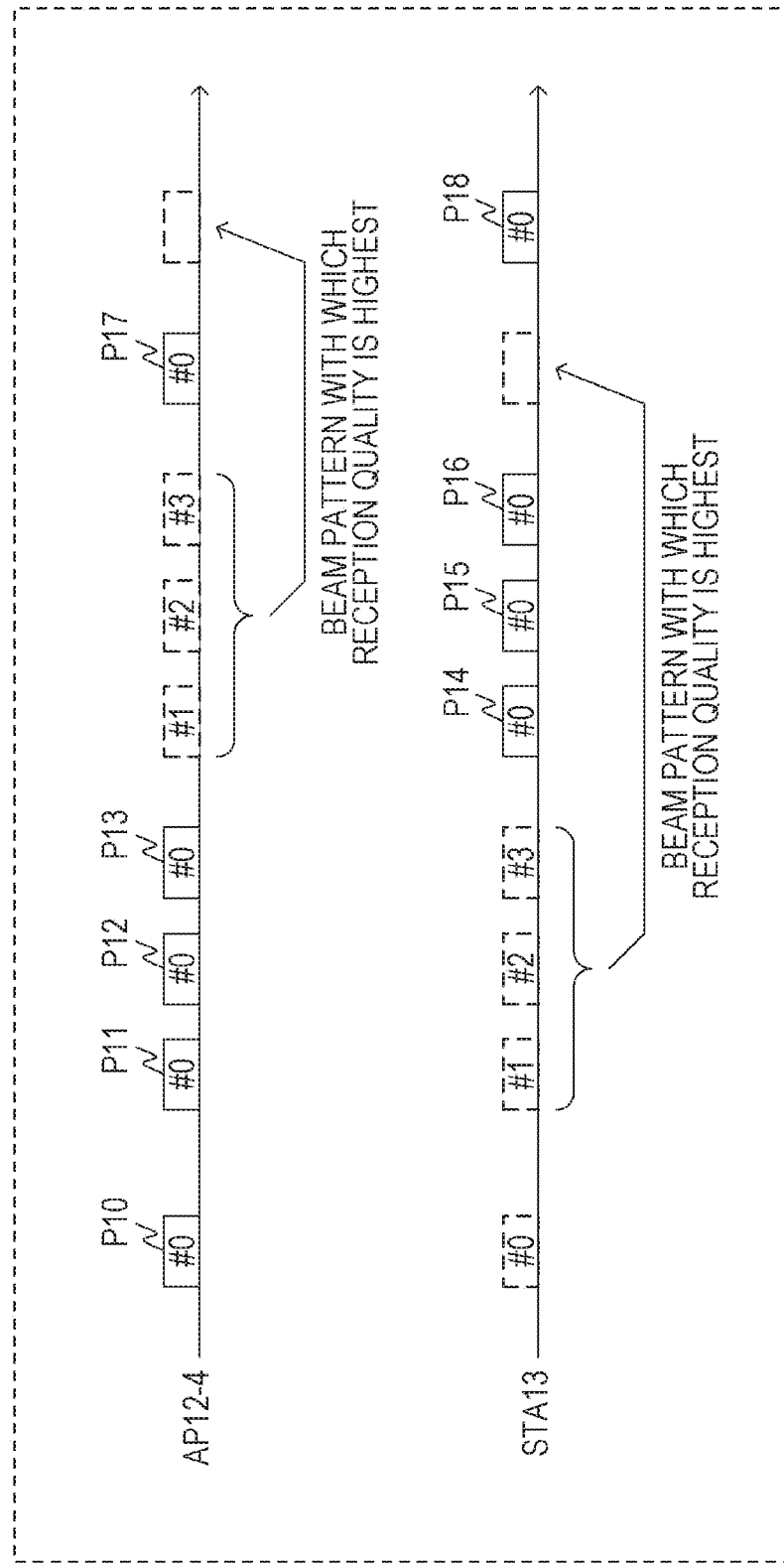
FIG. 6 illustrates one example of a sequence in a beam selection protocol.

FIG. 6 illustrates one example of a sequence in a beam selection protocol. In the present embodiment, a description will be given of an example in which the receive sector sweep (RXSS) defined in IEEE802.11ad is used as a beam selection protocol. In the example described below, the beam selection protocol is executed between the AP 12-4 and the STA 13 each having the beam patterns illustrated in FIG. 5. Also, a protocol called TXSS, in addition to RXSS, is available as a beam selection protocol.

In FIG. 6, each horizontal axis represents time, and each rectangular block represents a packet to be transmitted or received. Each rectangular block indicated by a solid line represents a transmitted packet, and each rectangular block indicated by a dashed line represents a received packet. The numeral inside each rectangular block represents the beam ID of a beam pattern used to transmit or receive the corresponding packet. For example, in FIG. 6, P10 is a packet that the AP 12-4 transmits by using the beam pattern of beam #0 and that the STA 13 receives by using the beam pattern of beam #0.

The AP 12-4 transmits the packet P10, which is grant packet, to the STA 13 by using beam #0. The grant packet is a control packet for giving a notification indicating start of the beam selection protocol. The grant packet includes the type of beam selection protocol and the number of training packets to be used in the beam selection protocol. The type of beam selection protocol is RXSS. The number of training packets may be the number of directional beam patterns of the STA 13 which is obtained by executing TXSS before RXSS is executed.

The STA 13 receives the grant packet P10 by using beam #0 and recognizes that the beam selection protocol is to be executed.

Next, by using beam #0, the AP 12-4 transmits sector sweep (SSW) packets P11 to P13, which are training packets, to the STA 13 at regular intervals. The STA 13 receives the SSW packet P11 by using beam #1, receives the SSW packet P12 by using beam #2, and receives the SSW packet P13 by using beam #3.

The STA 13 then measures the reception qualities of the respective received packets (i.e., the reception qualities of the respective beams that were used). On the basis of the measured reception qualities, the STA 13 determines an optimum beam pattern for communicating with the AP 12-4. The reception qualities that are measured include, for example, at least one of a received signal strength indicator (RSSI), a signal-to-noise ratio (SNR), and a signal-to-interference plus noise power ratio (SINR).

After receiving the SSW packet P13, the STA 13 transmits SSW packets P14 to P16 to the AP 12-4 by using beam #0 at regular intervals. The AP 12-4 receives the SSW packet P14 by using beam #1, receives the SSW packet P15 by using beam #2, and receives the SSW packet P16 by using beam #3. The AP 12-4 then measures the reception qualities of the respective received packets. On the basis of the measured reception qualities, the AP 12-4 determines an optimum beam pattern for communicating with the STA 13.

After receiving the SSW packet P16, the AP 12-4 transmits an SSW-Feedback packet P17 to the STA 13 by using beam #0. The STA 13 receives the SSW-Feedback packet P17 by using the beam pattern (the beam pattern with which the reception quality is the highest) selected based on a measurement result of the reception qualities of the SSW packets P11 to P13. After receiving the SSW-Feedback packet P17, the STA 13 transmits an SSW-ACK packet P18 by using beam #0. The AP 12-4 receives the SSW-ACK packet P18 by using the beam pattern (the beam pattern with which the reception quality is the highest) selected based on a measurement result of the reception qualities of the SSW packets P14 to P16 and then ends the beam selection protocol.

The arrival-direction estimator 33 in the APC 11 obtains a reception quality from an AP (the AP 12-4 in the example in FIG. 6) that executed a beam selection protocol, and estimates the arrival direction vector of the STA 13 with respect to the AP on the basis of the obtained reception quality.

<Arrival-Direction Estimation Method>

Next, a description will be given of one example of the arrival-direction estimation method. FIG. 7 is a diagram illustrating one example of relationships between the beam patterns and angles of arrival directions in the first embodiment. In FIG. 7, A1 to A3, which are angles θ of arrival directions, are associated with the beams #1 to #3, respectively.

The arrival-direction estimator 33 in the APC 11 has the associations illustrated in FIG. 7. On the basis of the reception qualities obtained from each AP, the arrival-direction estimator 33 estimates an arrival direction vector. For example, when the beam pattern indicating the highest reception quality is beam #2, the APC 11 estimates the angle θ "A2" of the arrival direction as the arrival direction vector.

Although, in the above description, the APC 11 estimates the angle of the arrival direction on the basis of the beam pattern indicating the highest reception quality, the APC 11 may estimate the angle of the arrival direction on the basis of a plurality of reception qualities. For example, the APC 11 may obtain, as reception quality vectors, a set of reception qualities of signals that each AP receives while switching its plurality of beams (e.g., a set of three reception qualities of signals that each AP receives using beams #1 to #3) and may estimate the angle of the arrival direction on the basis of the reception quality vectors.

More specifically, the arrival-direction estimator 33 in the APC 11 obtains the reception quality vectors from the respective APs via the IF unit 30. The arrival-direction estimator 33 then compares the obtained reception quality vectors with pre-stored radiation pattern vectors of the respective APs. Each radiation pattern vector is a vector indicating a radiation strength, a reception strength, or a reception quality for the angle of each beam. For example, when each AP uses three beams, the radiation pattern vector is a vector constituted by three elements corresponding to the respective beams, and each element is given by a function of the angle θ. The radiation pattern vector may differ depending on the AP or may be the same.

For example, the arrival-direction estimator 33 performs pattern matching with each reception quality vector by changing the radiation angle θ of the radiation pattern vector, which is a function of the radiation angle θ. The arrival-direction estimator 33 may estimate that the radiation angle θ at which the radiation pattern vector is the most similar to the reception quality vector as a result of the pattern matching is the angle of the arrival direction.

For example, a K-nearest neighbor algorithm for making matching determination based on the smallest Euclidean distance between vectors, identification or regression based on a support vector machine (SVM) algorithm, identification or regression based on a decision tree or a random forest method, or identification or regression based on a neural network algorithm may be used as a method for the pattern matching. A plurality of algorithms and methods may also be combined together.

The arrival-direction estimator 33 sets an angle corresponding to the radiation pattern vector of the AP 12-3, the radiation pattern vector being the most similar to the reception quality vector obtained from the AP 12-3, as an angle $\theta_{12\text{-}3\_13}$ (see FIG. 12) of the arrival direction in a local coordinate system of the array antenna of the AP 12-3. The arrival-direction estimator 33 sets an angle corresponding to the radiation pattern vector of the AP 12-4, the radiation pattern vector being the most similar to the reception quality vector obtained from the AP 12-4, as an angle $\theta_{12\text{-}4\_13}$ (see FIGS. 10 and 12) of the arrival direction in a local coordinate system of the array antenna of the AP 12-4.

As described above, each AP receives signals transmitted from the STA 13 while switching the beam and calculates the reception qualities of the respective beams. Then, upon obtaining the reception qualities of the respective beams from each AP, the APC 11 may estimate the arrival direction vector thereof by comparing the obtained reception qualities with characteristics of the respective radiation angles of the beams. With this scheme, in a millimeter-wave wireless communications network, even when each AP and the STA 13 perform directivity control, it is possible to estimate the arrival direction vector with high accuracy.

The APC 11 can also estimate the arrival direction vector by using a reception quality determined in a beam selection protocol between each AP and the STA 13. Accordingly, it is not necessary to execute reception quality determination processing for the arrival direction estimation independently from the beam selection protocol, thereby making it possible to simplify the processing.

In the present disclosure, the arrival-direction estimation method is not limited to the above-described example.

<Operation of Position Estimating System>

Figure 8:
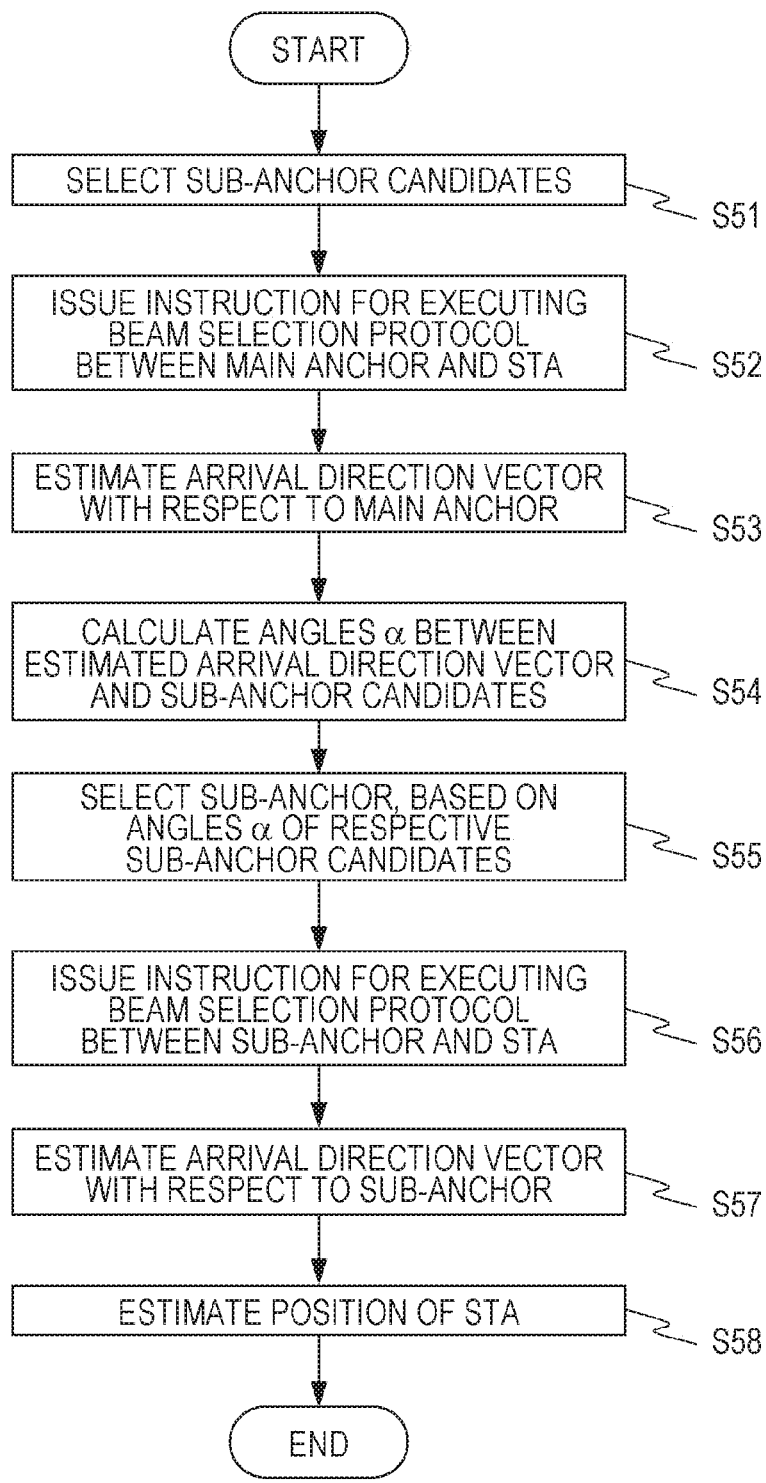
FIG. 8 is a flowchart illustrating one example of the operation of the position estimating system in the first embodiment of the present disclosure.

FIG. 8 is a flowchart illustrating one example of the operation of the position estimating system in the first embodiment.

In step S51, the APC 11 selects APs for sub-anchor candidates. For example, the APC 11 selects, as APs for sub-anchor candidates, APs that are present in a determined range from the AP 12-4 (i.e., the main anchor) that is connected to the STA 13.

In step S52, the APC 11 issues, to the AP 12-4, an instruction for executing a beam selection protocol between the AP 12-4 and the STA 13. On the basis of the instruction from the APC 11, the AP 12-4 executes the beam selection protocol with the STA 13. The AP 12-4 measures the reception qualities of respective beams in the beam selection protocol and then notifies the APC 11 about the reception qualities.

In step S53, on the basis of the reception qualities of the respective beams, the reception qualities being obtained from the AP 12-4, the APC 11 estimates the arrival direction vector of the STA 13 with respect to the AP 12-4.

In step S54, on the basis of the arrival direction vector of the STA 13 with respect to the AP 12-4, the arrival direction vector being estimated in step S53, and the positions of the sub-anchor candidates, the APC 11 determines the angles α of the respective sub-anchor candidates. This angle determination processing is described later.

In step S55, the APC 11 compares the angles α of the sub-anchor candidates, the angles being calculated in step S54, with each other to select an AP that serves as a sub-anchor. This sub-anchor selection processing is described later.

In step S56, the APC 11 issues, to the AP selected as the sub-anchor in step S55 (this AP is hereinafter referred to as the "sub-anchor"), an instruction for executing the beam selection protocol between the sub-anchor and the STA 13. On the basis of the instruction from the APC 11, the sub-anchor executes the beam selection protocol with the STA 13. The sub-anchor then notifies the APC 11 about the reception qualities of respective beams, the reception qualities being measured in the beam selection protocol.

One example of a method for the sub-anchor to execute the beam selection protocol with the STA 13 is a method in which under the control of the APC 11, the STA 13 performs handover from the AP 12-4 to the sub-anchor, and the STA 13 and the sub-anchor execute the beam selection protocol therebetween. Thereafter, under the control of the APC 11, the STA 13 may perform handover from the sub-anchor to the AP 12-4 again.

In step S57, on the basis of the reception qualities of the respective beams, the reception qualities being obtained from the sub-anchor, the APC 11 estimates the arrival direction vector of the STA 13 with respect to the sub-anchor.

In step S58, the APC 11 estimates the position (coordinates) of the STA 13 on the basis of the arrival direction vector of the STA 13 with respect to the AP 12-4, the arrival direction vector being estimated in step S53, and the arrival direction vector of the STA 13 with respect to the sub-anchor, the arrival direction vector being estimated in step S57. Thereafter, the position estimation processing ends.

By performing the above-described position estimation processing, the APC 11 estimates the position of the STA 13. Next, details of the angle determination processing and the sub-anchor selection processing and the position estimation processing after the sub-anchor selection processing will be described with reference to FIGS. 9 to 12.

FIGS. 9 to 12 are diagrams illustrating one example of processes in the position estimation processing in the first embodiment. Each of FIGS. 9 to 12 illustrates the APs 12-1 to 12-4 and the STA 13, as in FIG. 1. The APC 11 is not illustrated for convenience of description. In FIGS. 9 to 12, the APC 11 selects, as APs for sub-anchor candidates, the APs 12-1 to 12-3 that are present in a determined range from the AP 12-4.

Figure 9:
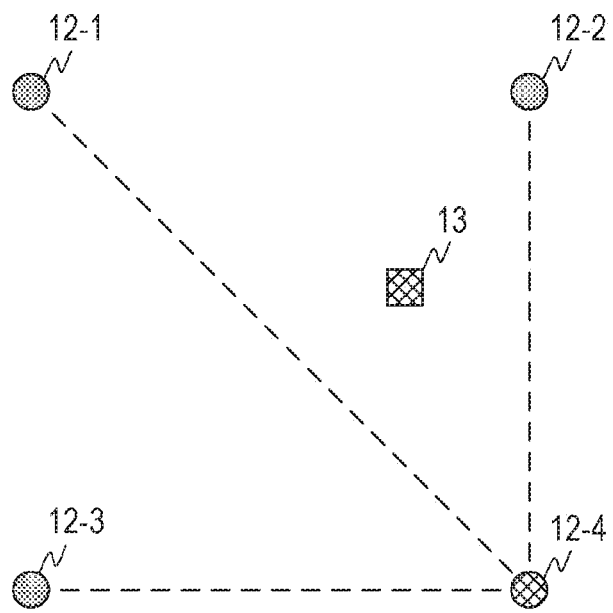
FIG. 9 is a diagram illustrating one example of processes in the position estimation processing in the first embodiment of the present disclosure.

FIG. 9 illustrates the sub-anchor candidates selected by the APC 11 in step S51. FIG. 9 also illustrates line segments each having end points at the position of the main anchor (the AP 12-4) and the position of the corresponding one of the sub-anchor candidates (the APs12-1 to 12-3).

Figure 10:
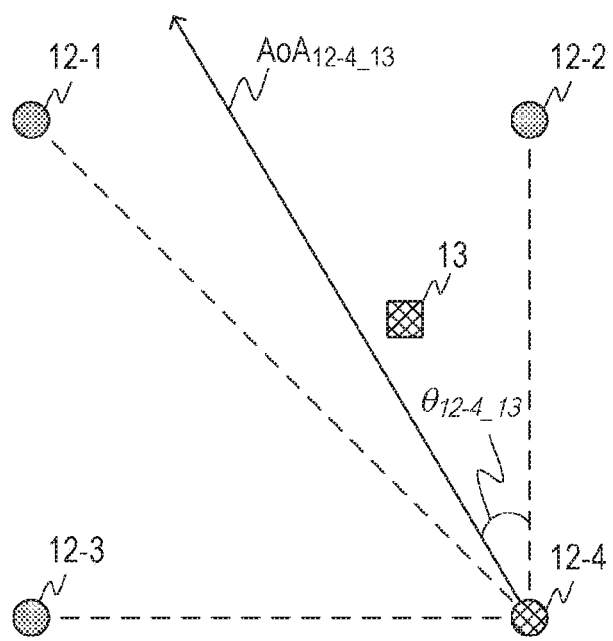
FIG. 10 is a diagram illustrating the example of the processes in the position estimation processing in the first embodiment of the present disclosure.

FIG. 10 illustrates the angle $\theta_{12\text{-}4\_13}$ of the arrival direction of the STA 13 with respect to the AP 12-4, the angle being obtained considering the positional relationship with another AP, and an arrival direction vector AoA (Angle of Arrival)$_{12\text{-}4\_13}$ for the angle $\theta_{12\text{-}4\_13}$ of the arrival direction. The angle of the arrival direction in this case is the angle α made by the arrival direction vector and a line segment having end points at a reference AP and another AP (step S54). AoA$_{12\text{-}4\_13}$ is the arrival direction vector that the APC 11 estimated in step S53, and the origin of AOA$_{12\text{-}4\_13}$ is the position of the main anchor AP 12-4. On the basis of AoA$_{12\text{-}4\_13}$ and the positions of the respective sub-anchor candidates, the APC 11 performs angle determination processing for determining the angles of the respective sub-anchor candidates.

Figure 11:
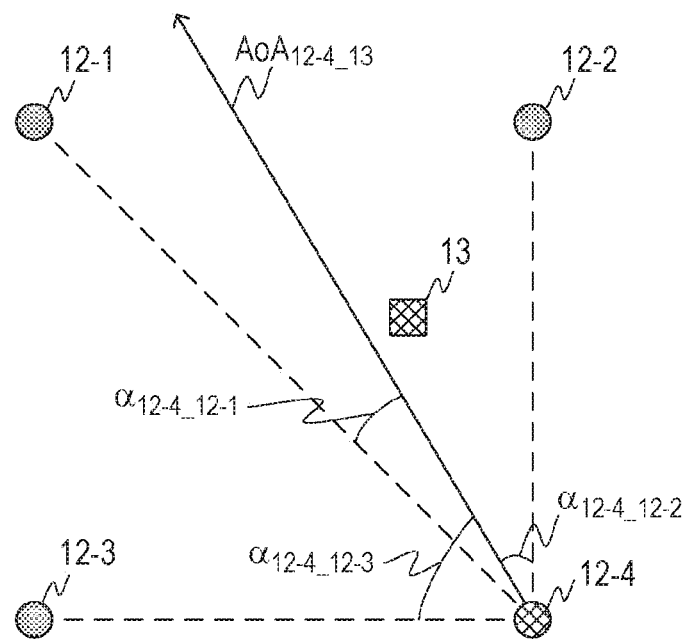
FIG. 11 is a diagram illustrating the example of the processes in the position estimation processing in the first embodiment of the present disclosure.

FIG. 11 illustrates the angles of the sub-anchor candidates, the angles being obtained as a result of the angle determination processing. In FIG. 11, $\alpha_{12\text{-}4\_12\text{-}1}$ is an angle that AoA$_{12\text{-}4\_13}$ makes with a line segment having end points at the position of the AP 12-1 and the position of the AP 12-4. Similarly, $\alpha_{12\text{-}4\_12\text{-}2}$ is an angle that AoA$_{12\text{-}4\_13}$ makes with a straight line having end points at the position of the AP 12-2 and the position of the AP 12-4. Also, $\alpha_{12\text{-}4\_12\text{-}3}$ is an angle that AoA$_{12\text{-}4\_13}$ makes with a line segment having end points at the position of the AP 12-3 and the position of the AP 12-4.

In the sub-anchor selection processing, the APC 11 selects, as the sub-anchor, the sub-anchor candidate with which the absolute value of the corresponding angle is smaller than or equal to 90° and is the largest of the angles of the sub-anchor candidates. In the case illustrated in FIG. 11, the APC 11 selects, as the sub-anchor, the sub-anchor candidate (i.e., the AP 12-3) corresponding to $\alpha_{12\text{-}4\_12\text{-}3}$ whose absolute value is smaller than or equal to 90° and is the largest of $\alpha_{12\text{-}4\_12\text{-}1}$, $\alpha_{12\text{-}4\_12\text{-}2}$, and $\alpha_{12\text{-}4\_12\text{-}3}$.

The APC 11 performs control so that the beam selection protocol is to be executed between the AP 12-3, which is the selected sub-anchor, and the STA 13. The AP 12-3 executes the beam selection protocol with the STA 13 and notifies the APC 11 about measured reception qualities of the respective beams. On the basis of the reception qualities obtained from the AP 12-3, the APC 11 estimates the arrival direction vector of the STA 13 with respect to the AP 12-3.

Figure 12:
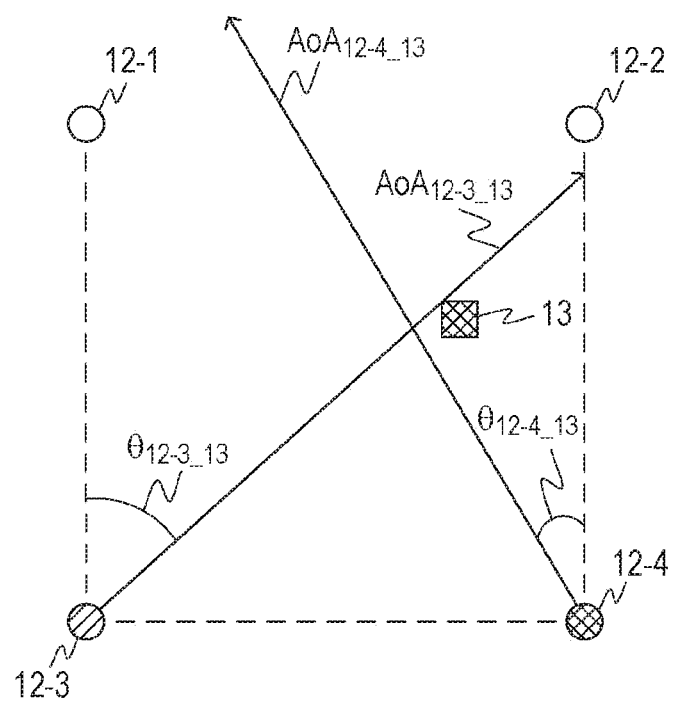
FIG. 12 is a diagram illustrating the example of the processes in the position estimation processing in the first embodiment of the present disclosure.

FIG. 12 illustrates the angle $\theta_{12\text{-}3\_13}$ of the arrival direction of the STA 13 with respect to the AP 12-3. The APC 11 estimates the position of the STA 13 on the basis of the angle ($\theta_{12\text{-}4\_13}$) of the arrival direction of the STA 13 with respect to the AP 12-4 and the angle ($\theta_{12\text{-}3\_13}$) of the arrival direction of the STA 13 with respect to the AP 12-3.

Although FIGS. 9 to 12 illustrate an example in which all the AP (the APs 12-1 to 12-3) except the main anchor are selected as sub-anchor candidates, the present disclosure is not limited thereto. An example in which some of the APs that connect to the APC 11 are selected as sub-anchor candidates will be described with reference to FIGS. 13 to 17.

FIGS. 13 to 17 are diagrams illustrating another example of the processes in the position estimation processing in the first embodiment. Each of FIGS. 13 to 17 illustrates APs 12-1 to 12-9 that connect to the APC 11 and the STA 13. The APC 11 is not illustrated for convenience of description.

Figure 13:
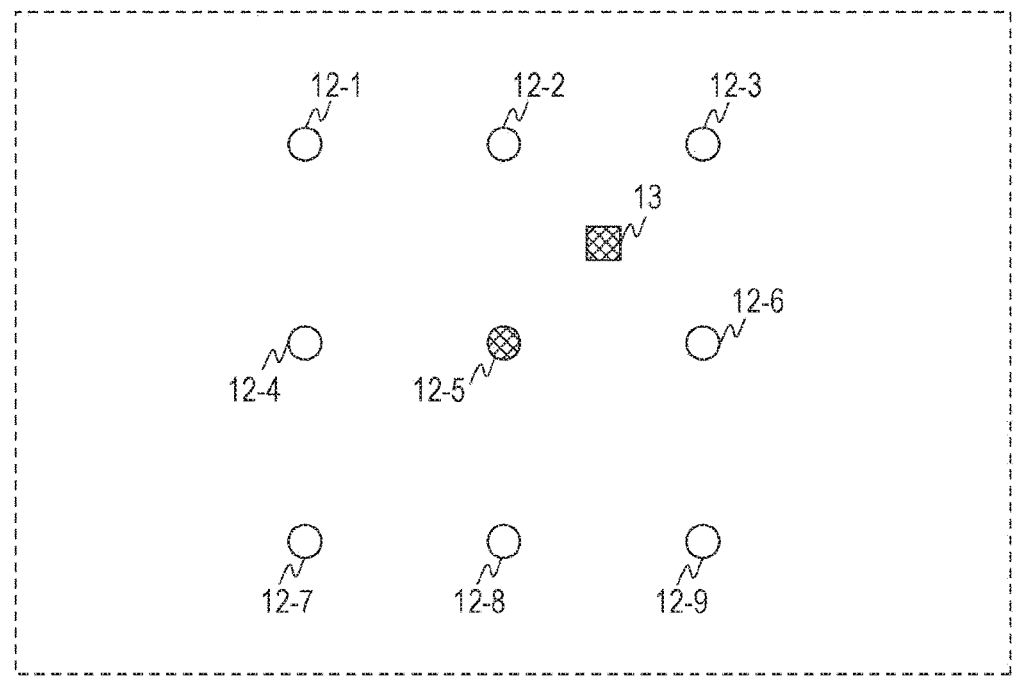
FIG. 13 is a diagram illustrating another example of the processes in the position estimation processing in the first embodiment of the present disclosure.

FIG. 13 illustrates a state in which the STA 13 is connected to the AP 12-5. That is, the AP 12-5 is a main anchor in the example in FIGS. 13 to 17. The APC 11 selects, as sub-anchor candidates, APs that are present in a determined range from the position of the AP 12-5.

Figure 14:
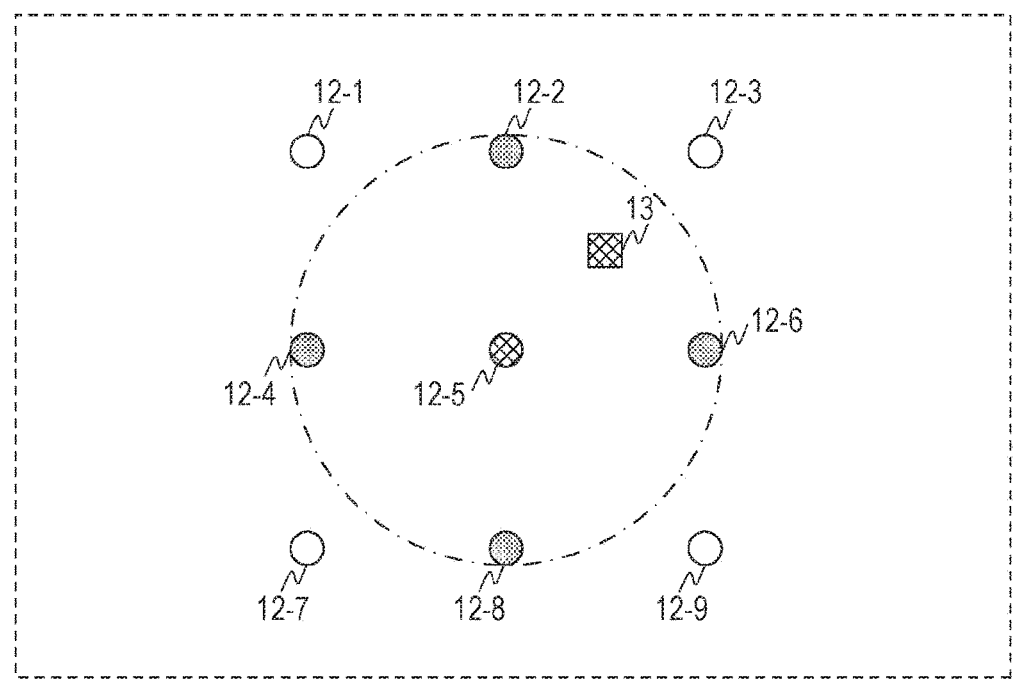
FIG. 14 is a diagram illustrating the other example of the processes in the position estimation processing in the first embodiment of the present disclosure.

FIG. 14 illustrates a state in which the APC 11 has selected sub-anchor candidates. The APC 11 obtains reception qualities of packets that the AP 12-5 receives from the STA 13 and sets a range for selecting sub-anchor candidates on the basis of the obtained reception qualities. The APC 11 selects, as sub-anchor candidates, the APs 12-2, 12-4, 12-6, and 12-8 that are present in the set range.

Figure 15:
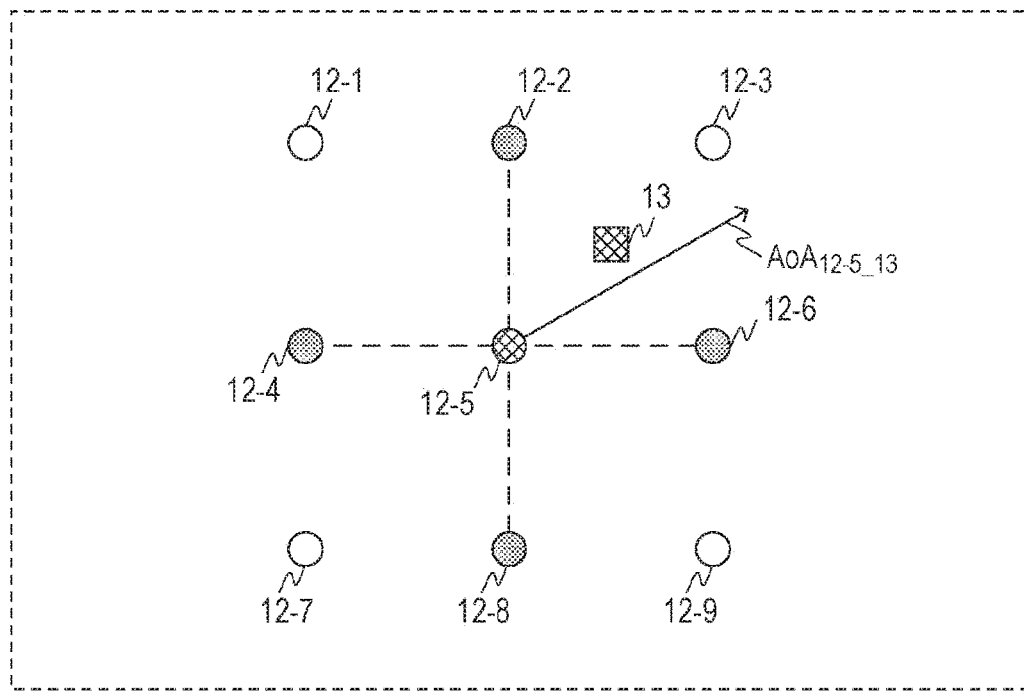
FIG. 15 is a diagram illustrating the other example of the processes in the position estimation processing in the first embodiment of the present disclosure.

FIG. 15 illustrates AoA$_{12\text{-}5\_13}$, which is the arrival direction vector of the STA 13 with respect to the AP 12-5. AoA$_{12\text{-}5\_13}$ is the arrival direction vector that the APC 11 estimated in step S53 (see FIG. 8), and the origin of the arrival direction vector is the position of the AP 12-5. FIG.

15 also illustrates line segments each having end points at the position of the main anchor (the AP 12-5) and the position of the corresponding one of the sub-anchor candidates (the APs 12-2, 12-4, 12-6, and 12-8). On the basis of $AoA_{12\text{-}5\_13}$ and the positions of the respective sub-anchor candidates, the APC 11 performs angle determination processing for calculating the angles of the respective sub-anchor candidates.

Figure 16:
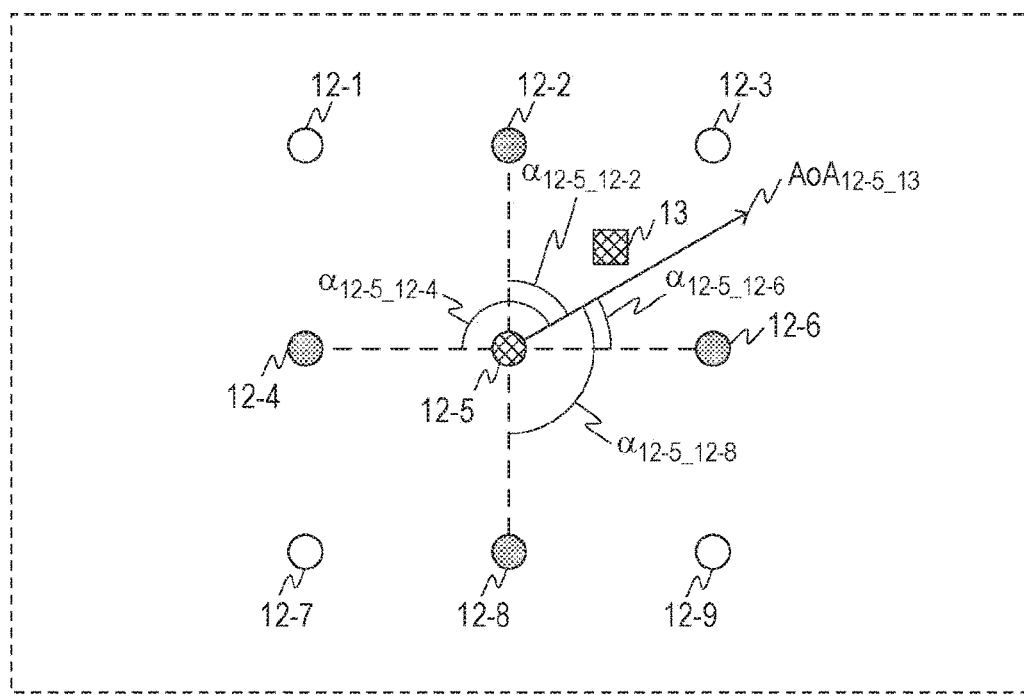
FIG. 16 is a diagram illustrating the other example of the processes in the position estimation processing in the first embodiment of the present disclosure.

FIG. 16 illustrates the angles of the respective sub-anchor candidates as a result of the angle determination processing. In FIG. 16, $\alpha_{12\text{-}5\_12\text{-}2}$ represents an angle that $AoA_{12\text{-}5\_13}$ makes with a line segment having end points at the position of the AP 12-2 and the position of the AP 12-5. Similarly, $\alpha_{12\text{-}5\_12\text{-}4}$ represents an angle that $AOA_{12\text{-}5\_13}$ makes with a line segment having end points at the position of the AP 12-4 and the position of the AP 12-5. Also, $\alpha_{12\text{-}5\_12\text{-}6}$ represents an angle that $AoA_{12\text{-}5\_13}$ makes with a line segment having end points at the position of the AP 12-6 and the position of the AP 12-5. Furthermore, $\alpha_{12\text{-}5\_12\text{-}8}$ represents an angle that $AoA_{12\text{-}5\_13}$ makes with a line segment having end points at the position of the AP 12-8 and the position of the AP 12-5.

In the sub-anchor selection processing, the APC 11 selects, as the sub-anchor, the sub-anchor candidate with which the absolute value of the corresponding angle is smaller than or equal to 90° and is the largest of the angles of the sub-anchor candidates. In the case illustrated in FIG. 16, the APC 11 selects, as the sub-anchor, the sub-anchor candidate (i.e., the AP 12-2) corresponding to $\alpha_{12\text{-}5\_12\text{-}2}$ whose absolute value is smaller than or equal to 90° and is the largest of $\alpha_{12\text{-}5\_12\text{-}2}$, $\alpha_{12\text{-}5\_12\text{-}4}$, $\alpha_{12\text{-}5\_12\text{-}6}$, and $\alpha_{12\text{-}5\_12\text{-}8}$.

The APC 11 performs control so that the beam selection protocol is to be executed between the AP 12-2, which is the selected sub-anchor, and the STA 13. The AP 12-2 executes the beam selection protocol with the STA 13 to measure the reception qualities of respective beams and notifies the APC 11 about the measured reception qualities. On the basis of the reception qualities obtained from the AP 12-2, the APC 11 estimates the arrival direction vector of the STA 13 with respect to the AP 12-2.

Figure 17:
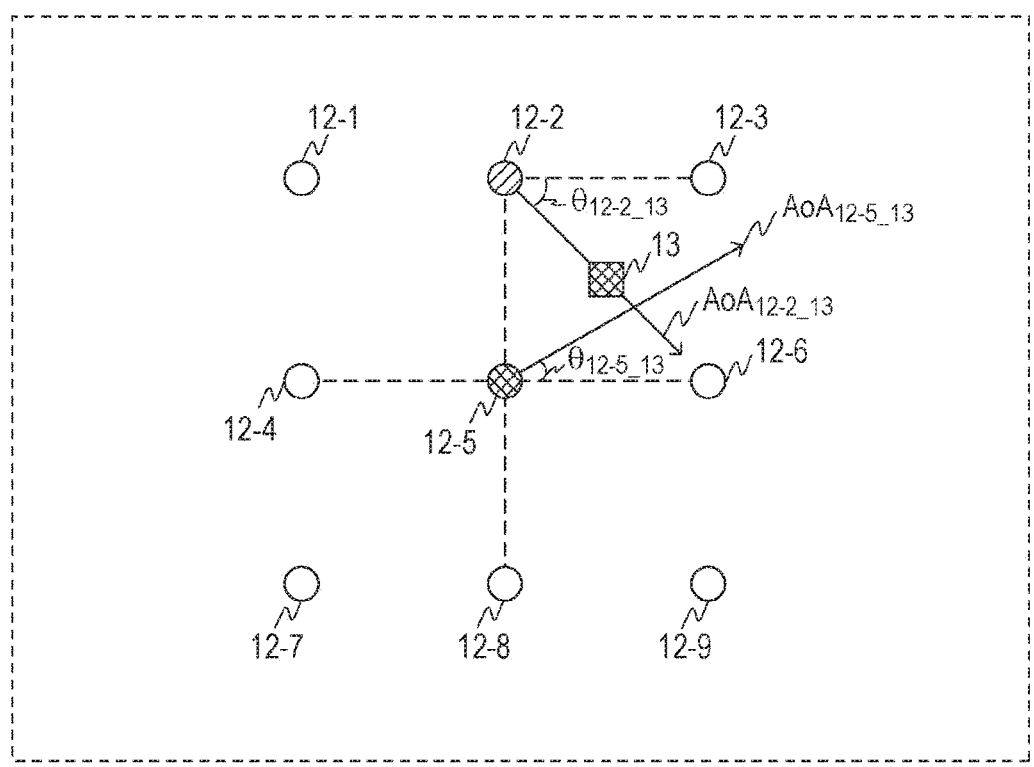
FIG. 17 is a diagram illustrating the other example of the processes in the position estimation processing in the first embodiment of the present disclosure.

FIG. 17 illustrates an angle $\theta_{12\text{-}2\_13}$ of the arrival direction of the STA 13 with respect to the AP 12-2. On the basis of the angle ($\theta_{12\text{-}5\_13}$) of the arrival direction of the STA 13 with respect to the AP 12-5 and the angle ($\theta_{12\text{-}2\_13}$) of the arrival direction of the STA 13 with respect to the AP 12-2, the APC 11 estimates the position of the STA 13.

Next, a description will be given of one example of a position estimation algorithm for estimating the position of the STA 13 on the basis of the angle of the arrival direction of the STA 13 with respect to the main anchor and the angle of the arrival direction of the STA 13 with respect to the sub-anchor. The APC 11 executes position estimation based on the algorithm. In the description below, the APC 11 performs position estimation in the example illustrated in FIGS. 9 to 12.

The arrival-direction estimator 33 sets an arrival direction vector for the angle of an estimated arrival direction (this angle is hereinafter referred to as an "arrival angle", as appropriate). The arrival angle is an angle in a plane in which the APs 12-1, 12-2, 12-3, and 12-4 are present. Thus, using a homogeneous coordinate expression, an arrival direction vector $AoA_1$ for an arrival angle $\theta_1$ (corresponding to $\theta_{12\text{-}3\_13}$ in FIG. 12) and an arrival direction vector $AoA_2$ for an arrival angle $\theta_2$ (corresponding to $\theta_{12\text{-}4\_13}$ in FIGS. 10 and 12) are given by:

$$AoA_1 = (\cos\theta_1, 0, \sin\theta_1, 1)^T$$
$$AoA_2 = (\cos\theta_2, 0, \sin\theta_2, 1)^T \quad (1)$$

The arrival direction vector $AoA_1$ in equation (1) is represented by a unit vector having a magnitude of 1 in a local coordinate system for the AP 12-3. The arrival direction vector $AoA_2$ in equation (1) is represented by a unit vector having a magnitude of 1 in a local coordinate system for the AP 12-4. That is, the arrival direction vector $AoA_1$ and the arrival direction vector $AoA_2$ are defined in respective different local coordinate systems.

Figure 18:
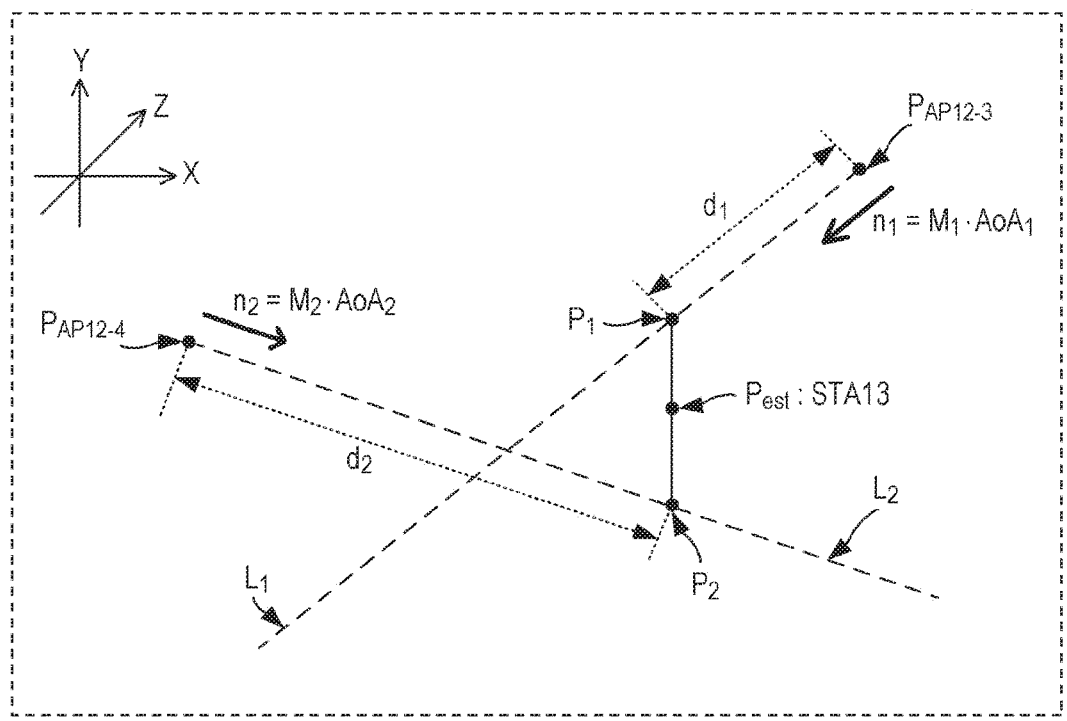
FIG. 18 is a diagram illustrating one example of a method for determining the position of the STA in the position estimation processing in the first embodiment of present disclosure.

After the arrival direction vectors are defined as described above, the APC 11 performs processing for estimating the position of the STA 13 on the basis of the arrival direction vectors of the two APs (the APs 12-3 and 12-4). FIG. 18 is a diagram illustrating one example of a method for determining the position of the STA 13 in the position estimation processing in the first embodiment of present disclosure.

FIG. 18 illustrates the position (a point $P_{AP12\text{-}3} = (x_1, y_1, z_1, 0)$) of the AP 12-3, the position (a point $P_{AP12\text{-}4} = (x_2, y_2, z_2, 0)$) of the AP 12-4, and the estimated position (a point $P_{est}$) of the STA 13 in a world coordinate system expressed by an X-axis, a Y-axis, and a Z-axis. Also, $n_1$ illustrated in FIG. 18 is a direction vector calculated using the orientation of the array antenna of the AP 12-3 and the arrival direction vector $AoA_1$. Also, $n_2$ is a direction vector calculated using the orientation of the array antenna of the AP 12-4 and the arrival direction vector $AoA_2$.

FIG. 18 further illustrates a straight line $L_1$ that runs through the point $P_{AP12\text{-}3}$ and that is parallel to the direction vector $n_1$ and a straight line $L_2$ that runs through the point $P_{AP12\text{-}4}$ and that is parallel to the direction vector $n_2$. The direction vector $n_1$ and the direction vector $n_2$ are expressed as three-dimensional vectors on the XYZ-axes. In this case, of points on the straight line $L_1$, a point $P_1$ is a point that is the closest to the straight line $L_2$, and of points on the straight line $L_2$, a point $P_2$ is a point that is the closest to the straight line $L_1$. Also, a distance $d_1$ illustrated in FIG. 18 is the distance between the point $P_{AP12\text{-}3}$ and the point $P_1$, and a distance $d_2$ is the distance between the point $P_{AP12\text{-}4}$ and the point $P_2$.

In the position estimation processing, the position estimator 35 calculates the direction vectors $n_1$ and $n_2$ and the points $P_1$ and $P_2$ and calculates a midpoint of a line segment $P_1P_2$ as the estimated position $P_{est}$ of the STA 13.

The direction vector $n_1$ is a combination vector of an orientation transformation matrix $M_1$ corresponding to the orientation of the array antenna of the AP 12-3 and the arrival direction vector $AoA_1$. In order to transform the arrival direction vector $AoA_1$ expressed in the local coordinate system of the array antenna of the AP 12-3 into a world coordinate system, the position estimator 35 performs arithmetic operation on the orientation transformation matrix $M_1$ of the array antenna, the orientation transformation matrix $M_1$ being expressed using Euler angles (r, p, h), and the arrival direction vector $AoA_1$. The orientation transformation matrices of the array antennas of the respective APs are pre-stored in the position estimator 35.

For example, in a world coordinate system with an X-axis, a Y-axis, and a Z-axis, an orientation transformation matrix M based on the Euler transform E (r, p, h) is given by.

$$M = E(h, p, r) = R_y(h)R_x(p)R_z(r) = \begin{pmatrix} \cos(h) & 0 & \sin(h) & 0 \\ 0 & 1 & 0 & 0 \\ -\sin(h) & 0 & \cos(h) & 0 \\ 0 & 0 & 0 & 1 \end{pmatrix} \quad (2)$$

-continued $$\begin{pmatrix} 1 & 0 & 0 & 0 \\ 0 & \cos(p) & -\sin(p) & 0 \\ 0 & \sin(p) & \cos(p) & 0 \\ 0 & 0 & 0 & 1 \end{pmatrix} \begin{pmatrix} \cos(r) & -\sin(r) & 0 & 0 \\ \sin(r) & \cos(r) & 0 & 0 \\ 0 & 0 & 1 & 0 \\ 0 & 0 & 0 & 1 \end{pmatrix}$$

where r represents a rotation angle about the Z-axis, p represents a rotation angle about the X-axis, and h represents a rotation angle about the Y-axis.

That is, using the orientation transformation matrix $M_1$ corresponding to the orientation of the array antenna of the AP 12-3 and the arrival direction vector $AoA_1$, the direction vector $n_1$ is calculated according to:

$$n_1 = M_1 AoA_1 \qquad (3)$$
$$= R_y(h_1)R_x(p_1)R_z(r_1)AoA_1$$

Similarly, using the orientation transformation matrix $M_2$ corresponding to the orientation of the array antenna of the AP 12-4 and the arrival direction vector $AoA_2$, the direction vector $n_2$ is calculated according to.

$$n_2 = M_2 AoA_2 \qquad (4)$$
$$= R_y(h_2)R_x(p_2)R_z(r_2)AoA_2$$

Next, the position estimator 35 calculates the points $P_1$ and $P_2$. Since the line segment $P_1P_2$, which connects the points $P_1$ and $P_2$, is orthogonal to both the straight lines $L_1$ and $L_2$, equation (5) below holds for the points $P_1$ and $P_2$.

$$n_1 \cdot (P_2 - P_1) = 0$$
$$n_2 \cdot (P_2 - P_1) = 0 \qquad (5)$$

where "." represents a scalar-product arithmetic operation between vectors.

Also, since the distance $d_1$ is the distance between the point $P_{AP12\text{-}3}$ and the point $P_1$, and the distance $d_2$ is the distance between the point $P_{AP12\text{-}4}$ and point $P_2$, equation (6) below holds for the points $P_1$ and $P_2$.

$$P_1 = P_{AP12\text{-}3} + d_1 * n_1$$
$$P_2 = P_{AP12\text{-}4} + d_2 * n_2 \qquad (6)$$

where, "*" represents a scalar-multiplication arithmetic operation. For example, $d_1 * n_1$ indicates that the direction vector $n_1$ is multiplied by $d_1$.

The position estimator 35 calculates the distances $d_1$ and $d_2$ by using equation (7), which is based on equations (5) and (6).

$$d_1 = \frac{n_1 \cdot P_{A21} - n_{ip} * (n_2 \cdot P_{A21})}{1 - n_{ip} * n_{ip}} \qquad (7)$$

$$d_2 = \frac{n_{ip} * (n_1 \cdot P_{A21}) - n_2 \cdot P_{A21}}{1 - n_{ip} * n_{ip}}$$

where $P_{A21} = P_{A12\text{-}4} - P_{AP12\text{-}3}$, and $n_{ip} = n_1 \cdot n_2$. That is, $n_{ip}$ represents a scalar quantity.

The position estimator 35 calculates points $P_1$ and $P_2$ by using the calculated distances $d_1$ and $d_2$ and equation (6) noted above. The position estimator 35 then determines the estimated position (the point $P_{est}$) of the STA 13 by using:

$$P_{est} = \frac{P_1 + P_2}{2} \qquad (8)$$

When the direction vectors $n_1$ and $n_2$ are parallel to each other, it is difficult for the position estimator 35 to calculate the points $P_1$ and $P_2$. In this case, the position estimator 35 determines a plurality of points $P^{est}$ on the basis of reception quality vectors obtained from combinations of APs, for example, each of a combination of the AP 12-3 and another AP and a combination of the AP 12-4 and the other AP. Then, the position estimator 35 may use the midpoint, the barycenter point, or the like of the plurality of points $P_{est}$ as the estimated position of the STA13. In this case, when the length of the line segment $P_1P_2$ in the combinations of the APs is larger than a determined threshold, the position estimator 35 determines that the amount of error is large and excludes the corresponding point from the plurality of points $P_{est}$ during determination of the estimated position.

Also, when a known obstacle (e.g., a floor surface or a ceiling surface) exists in space where APs are placed, the position estimator 35 may estimate the position by limiting its estimation range to a range excluding the known obstacle. Information regarding the position of each known obstacle may be pre-stored in a storage unit.

For example, when the information indicates that the calculated point $P_{est}$ is located below a floor surface, the position estimator 35 may perform limitation or correction so that the estimated position of the STA 13 is situated above the floor surface.

Since the array antenna of each AP changes its directivity in a two-dimensional plane (i.e., the plane in which the APs 12-1, 12-2, 12-3, and 12-4 are placed) in the local coordinate system, the arrival direction vectors that are estimated are also arrival direction vectors in a two-dimensional plane. According to the present embodiment, the APC 11 transforms the estimated arrival direction vectors from the local coordinate system into the world coordinate system, and estimates the position of the STA 13 on the basis of the arrival direction vectors after the transformation and the positions of the APs in the world coordinate system. Thus, even when the estimated arrival direction vectors are arrival direction vectors in a two-dimensional plane, it is possible to estimate the position of the STA 13.

As described above, in the first embodiment, the APC 11 estimates the position of the STA 13 on the basis of the angle of the arrival direction of the STA 13 with respect to the main anchor and the angle of the arrival direction of the STA 13 with respect to the sub-anchor. Then, in the sub-anchor selection processing, the APC 11 selects, as the sub-anchor, the sub-anchor candidate with which the absolute value of the corresponding angle is smaller than or equal to 90° and is the largest of the angles of the sub-anchor candidates. With this processing, the angle made by the two straight lines that are respectively derived from the angle of the arrival direction of the STA 13 with respect to the main anchor and the angle of the arrival direction of the STA 13 with respect to the sub-anchor increases, thus making it possible to estimate the position of the STA 13.

Although, in the first embodiment, the arrival-direction estimator 33 in the APC 11 has been described as executing the arrival-direction estimation processing, the present disclosure is not limited thereto. Each AP may execute the arrival-direction estimation processing. In such a case, each AP pre-stores therein characteristics (e.g., radiation pattern vectors) of the array antenna. Each AP then transmits the estimated arrival direction vector (e.g., the arrival direction vector AoA) to the APC 11 via the IF unit 43.

Second Embodiment

In the first embodiment, the description has been given of an example in which the angles that the arrival direction vector of the STA 13 with respect to the main anchor makes with the line segments each having end points at the position of the main anchor and the position of the corresponding one of the sub-anchor candidates are calculated in the angle determination processing. In a second embodiment, a description will be given of an example in which angles that the arrival direction vectors of the STA 13 with respect to respective sub-anchor candidates makes with corresponding line segments each having end points at the position of the main anchor and the corresponding one of the sub-anchor candidates are calculated in the angle determination processing.

A system configuration and the configurations of apparatuses in the second embodiment are substantially the same as those described in the first embodiment. The description below will be given of the operation of a position estimating system according to the second embodiment.

<Operation of Position Estimating System>

Figure 19:
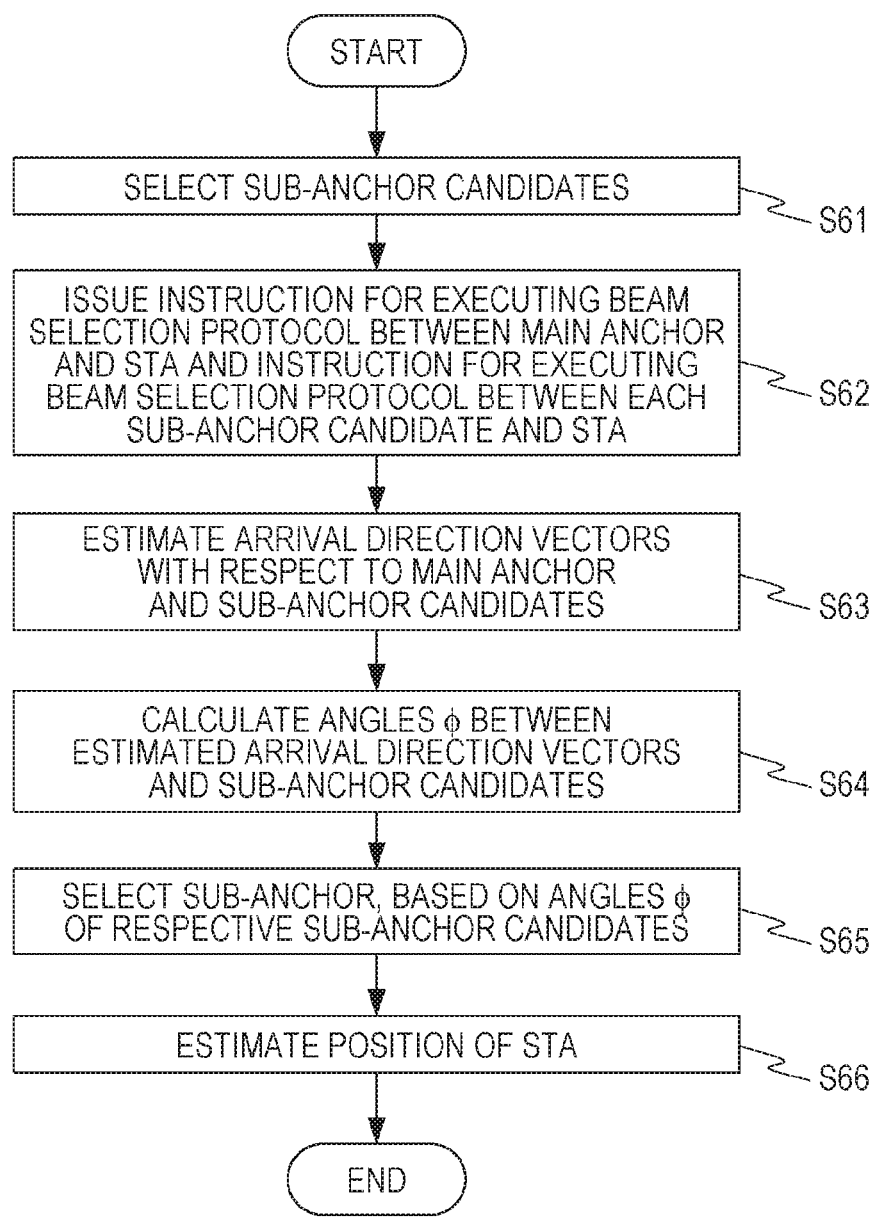
FIG. 19 is a flowchart illustrating one example of the operation of a position estimating system according to a second embodiment of the present disclosure.

FIG. 19 is a flowchart illustrating one example of the operation of a position estimating system according to the second embodiment.

In step S61, the APC 11 selects APs for sub-anchor candidates. For example, the APC 11 selects, as APs for sub-anchor candidates, APs that are present in a determined range from the AP 12-4 (i.e., the main anchor) that is connected to the STA 13.

In step S62, the APC 11 issues, to the main anchor, an instruction for executing a beam selection protocol between the main anchor and the STA 13 and issues, to each of the sub-anchor candidates, an instruction for executing the beam selection protocol between the corresponding sub-anchor candidate and the STA 13. For example, the APC 11 issues an instruction for executing the beam selection protocol between the AP 12-4, which is the main anchor, and the STA 13, to the AP 12-4.

After the beam selection protocol between the AP 12-4 and the STA 13 is finished, the APC 11 issues an instruction for executing the beam selection protocol between the AP 12-1, which is a sub-anchor candidate, and the STA 13 to the AP 12-1. Also, the APC 11 sequentially issues, to each sub-anchor candidate, an instruction for executing the beam selection protocol between the sub-anchor candidate and the STA 13.

Each of the AP 12-4, which is the main anchor, and the APs 12-1 to 12-3, which are the sub-anchor candidates, notifies the APC 11 about the reception qualities of respective beams which were measured in the beam selection protocol.

In step S63, the APC 11 estimates the arrival direction vector of the STA 13 with respect to the AP 12-4 on the basis of the reception qualities of the respective beams, the reception qualities being obtained from the AP 12-4. Similarly, the APC 11 estimates the arrival direction vectors of the STA 13 with respect to the respective APs 12-1 to 12-3 on the basis of the reception qualities of the respective beams, the reception qualities being obtained from the corresponding APs 12-1 to 12-3.

In step S64, the APC 11 calculates angles of the sub-anchor candidates on the basis of the arrival direction vectors of the STA 13 with respect to the APs 12-1 to 12-3, the arrival direction vectors being estimated in step S63, and the positions of the APs for the sub-anchor candidates. This angle determination processing is described later.

In step S65, the APC 11 compares the angles of the sub-anchor candidates, the angles being calculated in step S64, with each other to select an AP that serves as a sub-anchor. This sub-anchor selection processing is described later.

In step S66, the APC 11 estimates the position (coordinates) of the STA 13 on the basis of the arrival direction vector of the STA 13 with respect to the AP 12-4 and the arrival direction vector of the STA 13 with respect to the sub-anchor, the arrival direction vectors being included in the arrival direction vectors estimated in step S63. Thereafter, the position estimation processing ends.

By performing the position estimation processing described above, the APC 11 estimates the position of the STA 13. Next, details of the angle determination processing and the sub-anchor selection processing in the position estimation processing and the position estimation processing after the sub-anchor selection processing will be described with reference to FIGS. 20 and 21.

Figure 20:
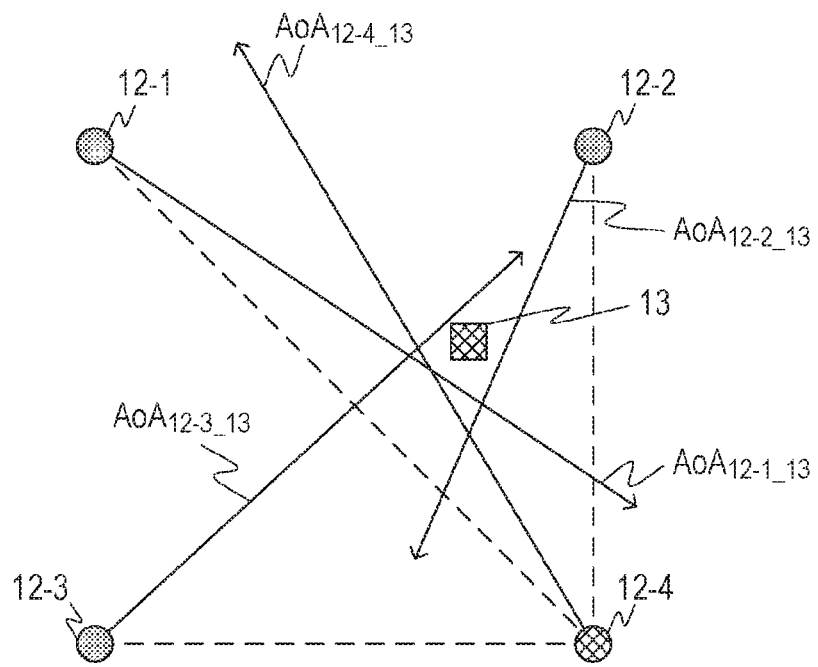
FIG. 20 is a diagram illustrating one example of processes in the position estimation processing in the second embodiment of the present disclosure.
Figure 21:
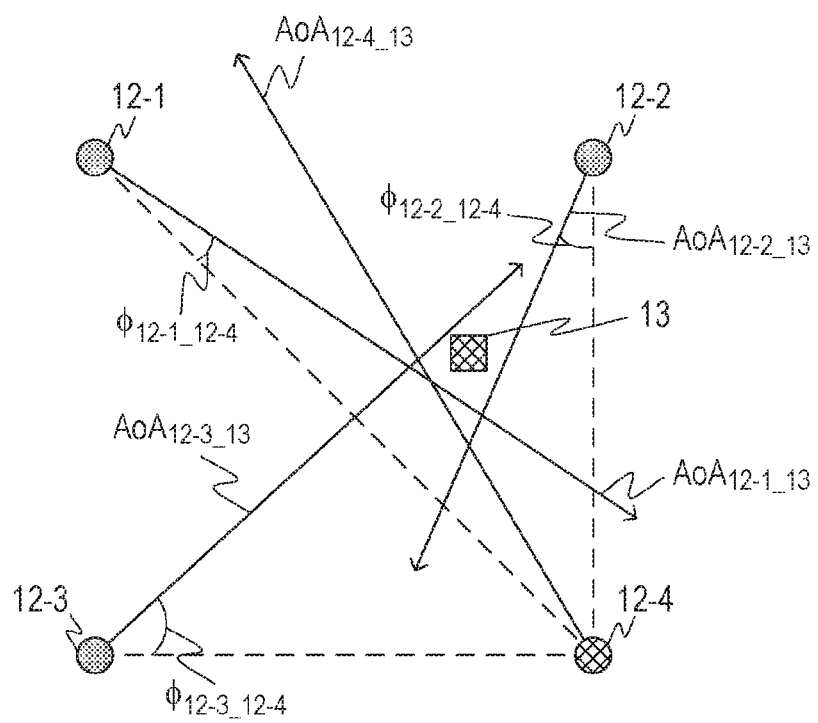
FIG. 21 is a diagram illustrating the example of the processes in the position estimation processing in the second embodiment of the present disclosure.

FIGS. 20 and 21 are diagrams illustrating one example of processes in the position estimation processing in the second embodiment. Each of FIGS. 20 and 21 illustrates the APs 12-1 to 12-4 and the STA 13, as in FIG. 1. The APC 11 is not illustrated for convenience of description.

FIG. 20 illustrates line segments each having end points at the position of the main anchor (the AP 12-4) and the position of the corresponding one of the sub-anchor candidates (APs 12-1 to 12-3). FIG. 20 also illustrates $AoA_{12\text{-}4\_13}$, which is the arrival direction vector of the STA 13 with respect to the AP 12-4, $AoA_{12\text{-}1\_13}$, which is the arrival direction vector of the STA 13 with respect to the AP 12-1, $AoA_{12\text{-}2\_13}$, which is the arrival direction vector of the STA 13 with respect to the AP 12-2, and $AoA_{12\text{-}3\_13}$, which is the arrival direction vector of the STA 13 with respect to the AP 12-3.

The arrival direction vectors illustrated in FIG. 20 are the arrival direction vectors estimated in step S63. The APC 11 performs angle determination processing for calculating the angles of the respective sub-anchor candidates on the basis of the arrival direction vectors of the sub-anchor candidates, that is, $AoA_{12\text{-}1\_13}$, $AoA_{12\text{-}2\_13}$, and $AoA_{12\text{-}3\_13}$, and the positions of the respective sub-anchor candidates.

FIG. 21 illustrates the angles of the respective sub-anchor candidates, the angles being obtained as a result of the angle determination processing. Also, $\phi_{12\text{-}1\_12\text{-}4}$ represents an angle that $AoA_{12\text{-}1\_13}$ makes with a line segment having end points at the position of the AP 12-1 and the position of the AP 12-4. Similarly, $\phi_{12\text{-}2\_12\text{-}4}$ represents an angle that $AoA_{12\text{-}2\_13}$ makes with a line segment having end points at the position of the AP 12-2 and the position of the AP 12-4. Also, $\phi_{12\text{-}3\_12\text{-}4}$ represents an angle that $AoA_{12\text{-}3\_13}$ makes with a line segment having end points at the position of the AP 12-3 and the position of the AP 12-4.

In the sub-anchor selection processing, the APC 11 selects, as the sub-anchor, the sub-anchor candidate with which the absolute value of the corresponding angle is smaller than or equal to 90° and is the largest of the angles of the sub-anchor candidates. In the case illustrated in FIG. 21, the APC 11 selects, as the sub-anchor, the sub-anchor candidate (i.e., the AP 12-3) corresponding to $\phi_{12\text{-}3\_12\text{-}4}$ whose absolute value is smaller than or equal to 90° and is the largest of $\phi_{12\text{-}1\_12\text{-}4}$, $\phi_{12\text{-}2\_12\text{-}4}$, and $\phi_{12\text{-}3\_12\text{-}4}$.

After performing the sub-anchor selection processing, the APC 11 estimates the position of the STA 13 on the basis of the arrival direction vector ($AoA_{12\text{-}4\_13}$) of the STA 13 with respect to the AP 12-4 and the arrival direction vector ($AoA_{12\text{-}3\_13}$) of the STA 13 with respect to the AP 12-3. Since the method described in the first embodiment can be applied to the present embodiment, a detailed description thereof is not given herein.

As described above, in the second embodiment, the APC 11 estimates the position of the STA 13 on the basis of the arrival direction vector with respect to the main anchor and the arrival direction vector with respect to the sub-anchor. Then, in the sub-anchor selection processing, the APC 11 selects, as the sub-anchor, the sub-anchor candidate with which the absolute value of the corresponding angle is smaller than or equal to 90° and is the largest of the angles of the sub-anchor candidates. With this processing, the angle made by the two straight lines that are respectively derived from the arrival direction vector of the STA 13 with respect to the main anchor and the arrival direction vector of the STA 13 with respect to the sub-anchor increases, thus making it possible to accurately estimate the position of the STA 13.

Also, in the second embodiment, the angle that the arrival direction vector of the STA 13 with respect to each sub-anchor candidate makes with the line segment having end points at the position of the sub-anchor candidate and the position of the main anchor is calculated in the angle determination processing. According to this processing, the arrival direction vector of an AP that is the main anchor and the arrival direction vectors of APs that are sub-anchor candidates are estimated, and the main anchor is changed so that the position estimation accuracy increases, thereby making it possible to estimate the position of the wireless terminal with high accuracy by using the changed main anchor and a sub-anchor.

Figure 22:
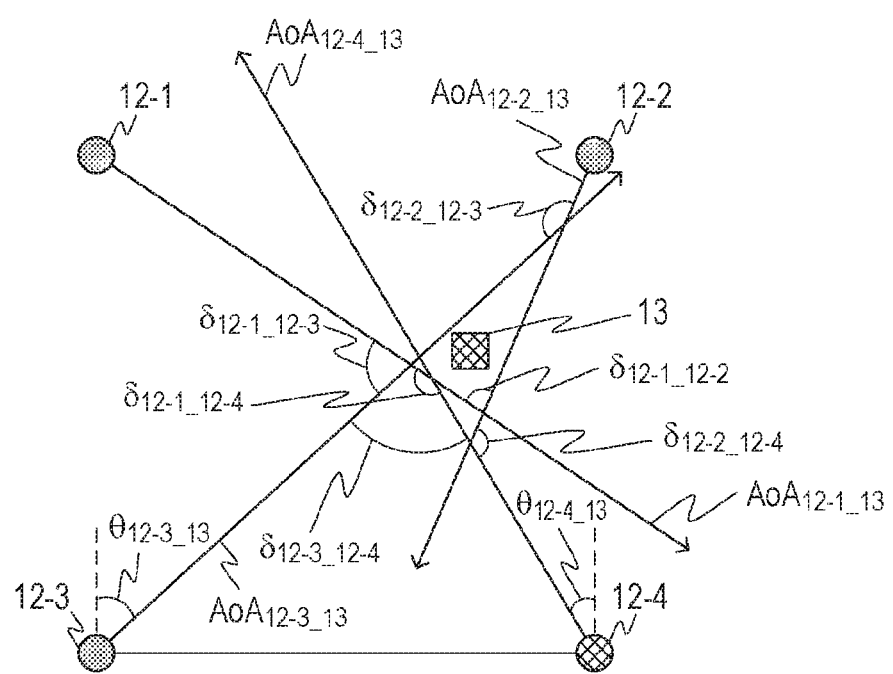
FIG. 22 is a diagram illustrating an example of a main-anchor selection method in the second embodiment of the present disclosure.

A main-anchor selection method the when the main anchor is changed will be described with reference to FIG. 22. FIG. 22 is a diagram illustrating an example of the main-anchor selection method in the second embodiment.

In FIG. 22, the APC 11 determines an angle δ made by arrival direction vectors AoA for respective two anchors (i.e., for the main anchor and a sub-anchor candidate and for two sub-anchor candidates). Specifically, the APC 11 calculates $\delta_{12\text{-}3\_12\text{-}4}$ on the basis of $AoA_{12\text{-}3\_13}$ and $AoA_{12\text{-}4\_13}$.

When the angle made by the arrival angle (the arrival direction vector) $AoA_{12\text{-}3\_13}$ with respect to the AP 12-3 and a line perpendicular to a line segment that connects the APs 12-3 and 12-4 is indicated by $\theta_{12\text{-}3\_13}$, and the angle made by the arrival angle (the arrival direction vector) $AoA_{12\text{-}4\_13}$ with respect to the AP 12-4 and a line perpendicular to the line segment that connects the APs 12-3 and 12-4 is indicated by $\theta_{12\text{-}4\_13}$, $\delta_{12\text{-}3\_12\text{-}4}$ is the sum of $\theta_{12\text{-}3\_13}$ and $\theta_{12\text{-}4\_13}$.

Similarly, the APC 11 calculates $\delta_{12\text{-}1\_12\text{-}3}$ by using $AoA_{12\text{-}1\_13}$ and $AoA_{12\text{-}3\_13}$, calculates $\delta_{12\text{-}2\_12\text{-}3}$ by using $AoA_{12\text{-}2\_13}$ and $AoA_{12\text{-}3\_13}$, calculates $\delta_{12\text{-}2\_12\text{-}4}$ by using $AoA_{12\text{-}2\_13}$ and $AoA_{12\text{-}4\_13}$, and calculates $\delta_{12\text{-}1\_12\text{-}2}$ by using $AoA_{12\text{-}1\_13}$ and $AoA_{12\text{-}2\_13}$. The APC 11 selects two APs with which the absolute value of "δ-90°" is the smallest as the main anchor and the sub-anchor. That is, two anchors with which the angle δ made by two arrival direction vectors is closer to 90° are selected as the main anchor and the sub-anchor.

Although a method for selecting the main anchor when the main anchor is changed has been described above, the AP to which the STA 13 is to be connected does not necessarily have to be changed. For example, when the position of the STA 13 is to be estimated, the role of the main anchor may be transferred to a post-change main anchor.

Modifications of Each Embodiment

Figure 23:
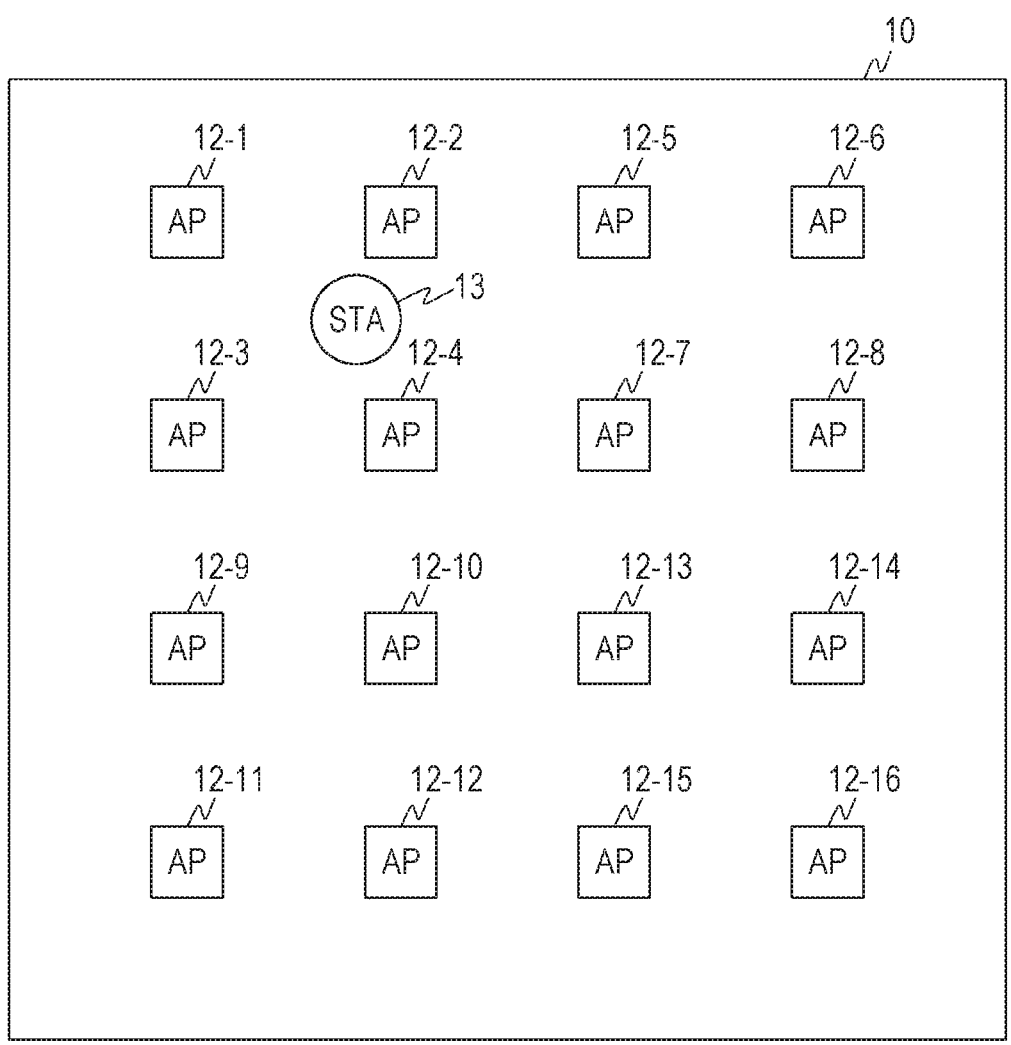
FIG. 23 is a diagram illustrating another example of the system configuration in the present disclosure.

Although a system configuration in which the APC 11 connects to four APs has been mainly described in each embodiment above, the present disclosure is not limited thereto. FIG. 23 is a diagram illustrating another example of the system configuration. FIG. 23 illustrates APs 12-1 to 12-16 that connect to the APC 11 (not illustrated) and the STA 13. In FIG. 23, the APC 11 connects to 16 APs, which is more than the four APs. Although not illustrated, the APC 11 may connect to three or less APs.

Figure 24:
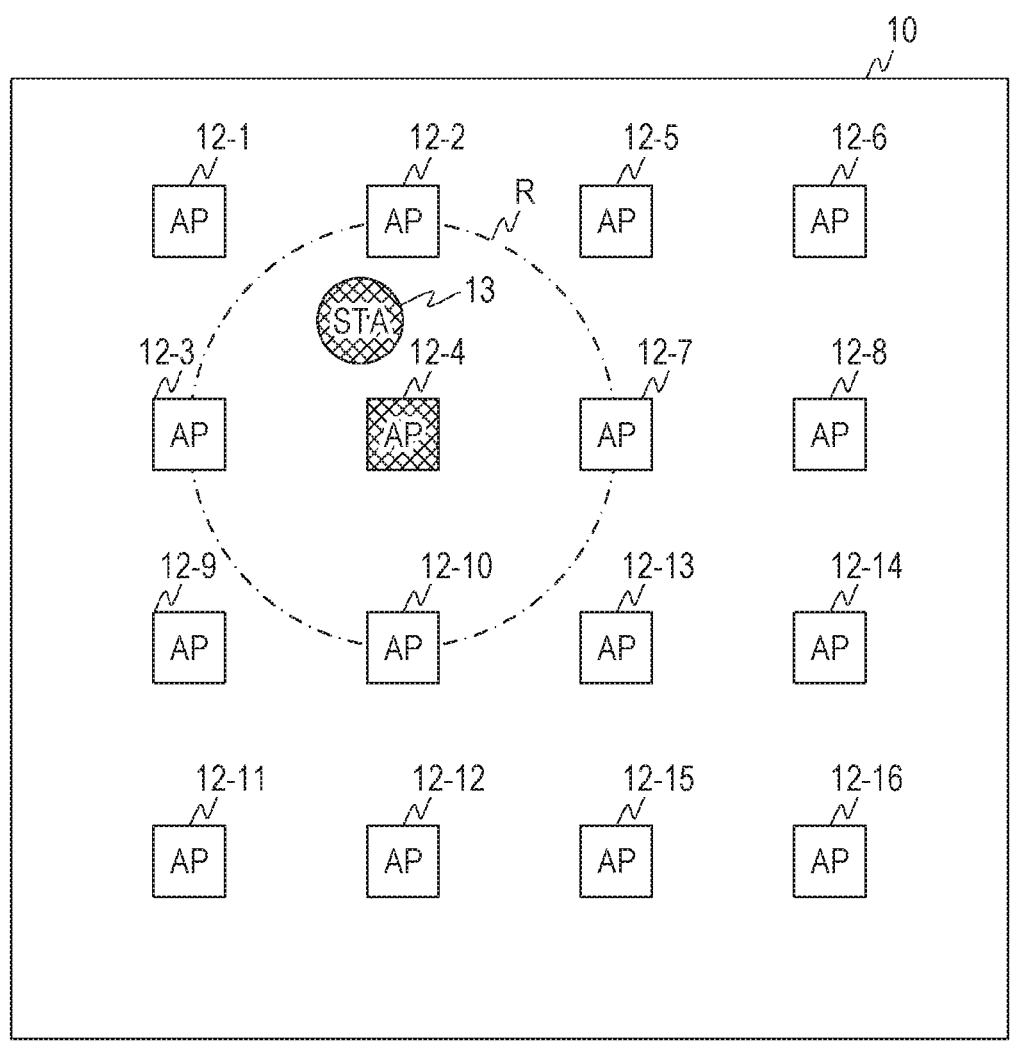
FIG. 24 is a diagram illustrating one example of sub-anchor candidate selecting processing illustrated in FIG. 23.

Sub-anchor candidate selecting processing in the example in FIG. 23 will be described with reference to FIG. 24. In FIG. 24, the STA 13 is connected to the AP 12-4. That is, the AP 12-4 is a main anchor. The APC 11 sets a radius on the basis of reception qualities of packets that the AP 12-4 receives from the STA 13. The APC 11 then selects, as sub-anchor candidates, APs that are present in a circular range having the set radius. In the example in FIG. 24, the APC 11 selects, as sub-anchor candidates, the APs 12-2, 12-3, 12-7, and 12-10 that are present in a range R set by the APC 11.

Although FIG. 24 illustrates an example in which a circular range having its center at the AP 12-4 and having the radius set based on the reception qualities is set when the APC 11 selects the sub-anchor candidates, the present disclosure is not limited thereto. The APC 11 may also set the range on the basis of the reception qualities of the respective beams of the AP 12-4.

Figure 25:
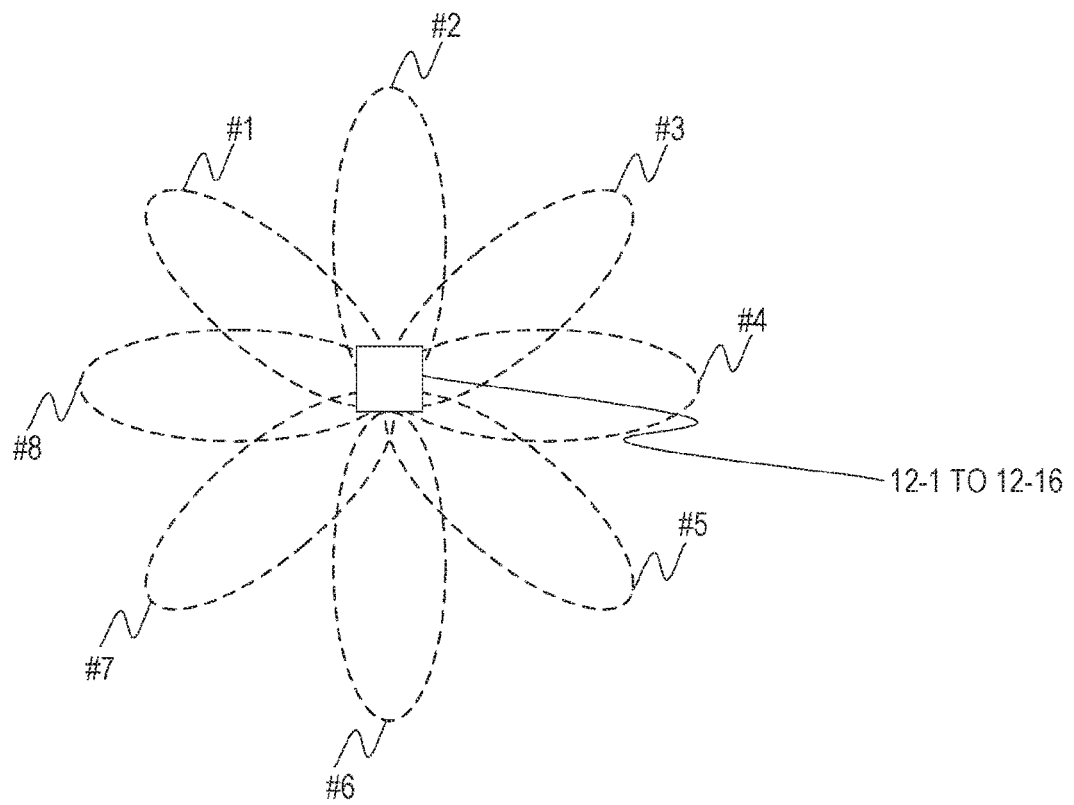
FIG. 25 is a diagram illustrating another example of the beam patterns of each AP.

FIG. 25 is a diagram illustrating another example of the beam patterns of each AP. FIG. 25 illustrates eight types of beam pattern (beams #1 to #8). In FIG. 25, a description of an omnidirectional beam pattern (e.g., beam #0 in FIG. 5) is not given for convenience of description.

When the AP 12-4, which is the main anchor, has the beam patterns illustrated in FIG. 25, the APC 11 may set a range that is different from the range illustrated in FIG. 24, on the basis of the reception qualities of packets that the AP 12-4 receives from the STA 13 by using the respective beam patterns.

FIG. 26 is a table illustrating one example of the reception qualities of the respective beam patterns illustrated in FIG. 25. FIG. 26 illustrates numerical values of the reception qualities of the respective beam patterns (beams #1 to #8) as one example. The APC 11 may select the beam patterns with which the corresponding reception qualities are higher than a threshold and may set, as a range in which sub-anchor candidates are to be selected, a communication range that can be covered using the selected beam patterns.

For example, when threshold is set to 50, the APC 11 selects beams #1, #2, and #8 illustrated in FIG. 26 and set, as a range in which sub-anchor candidates are to be selected, a range that can be covered using the selected beam patterns.

Figure 27:
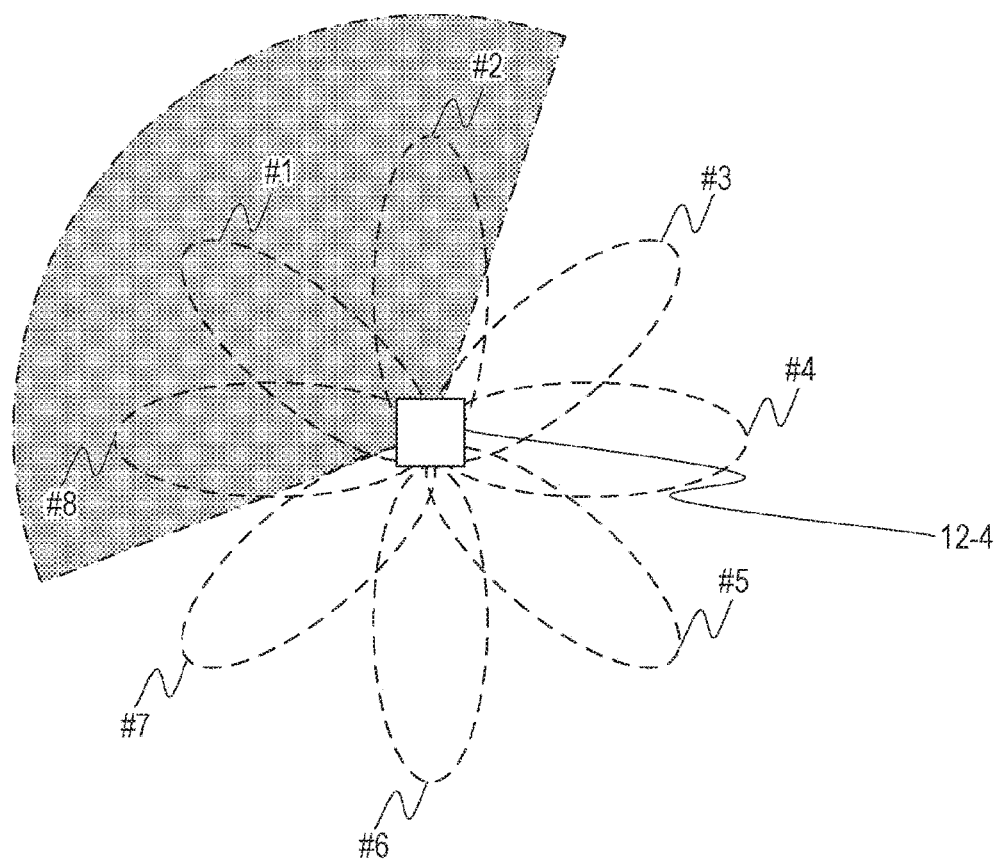
FIG. 27 illustrates a range covered using selected beams.
Figure 28:
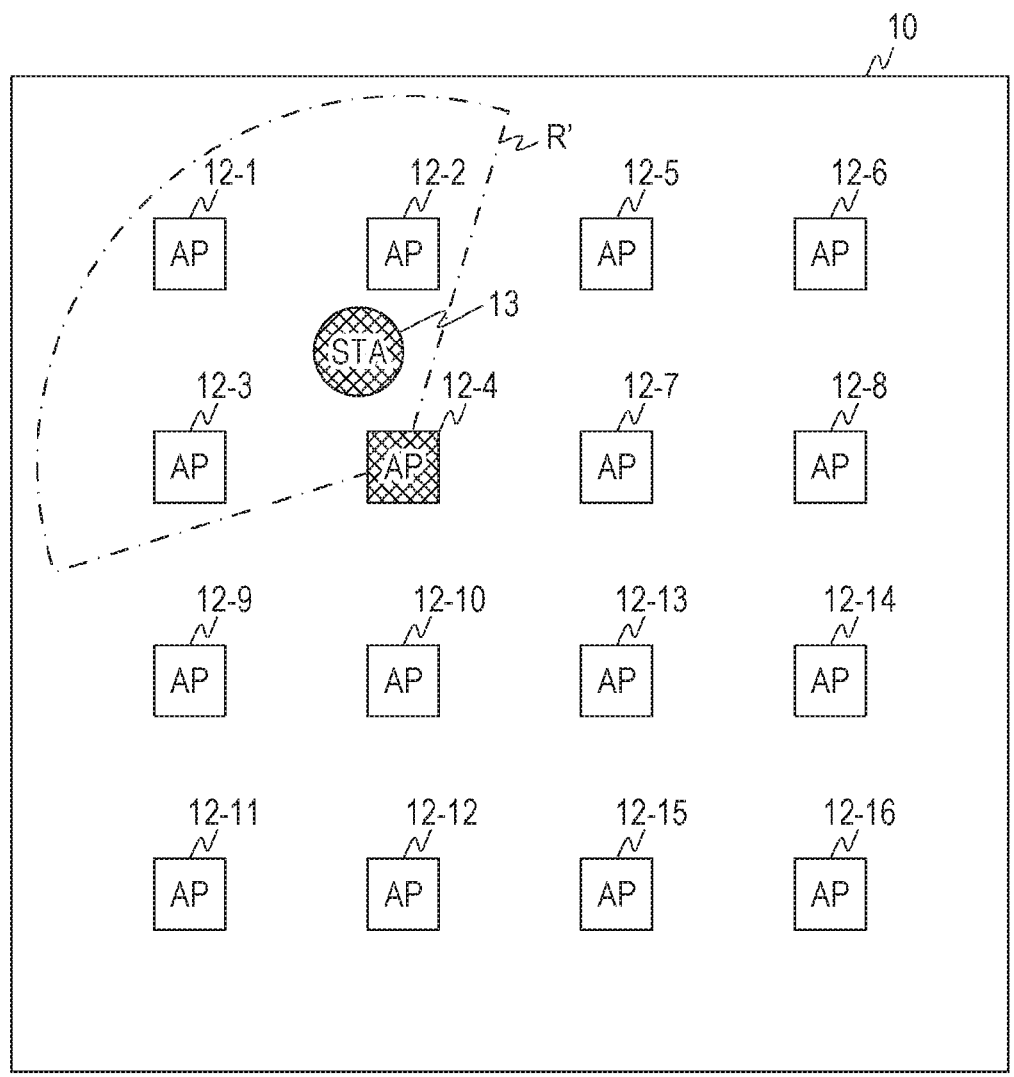
FIG. 28 is a diagram illustrating one example of sub-anchor candidates selected in the range illustrated in FIG. 27.

FIG. 27 illustrates a range covered using selected beams #1, #2, and #8. FIG. 28 is a diagram illustrating one example of sub-anchor candidates selected in the range illustrated in FIG. 27.

The APC 11 selects, as sub-anchor candidates, the APs (i.e., APs 12-1 to 12-3) that are present in a range R' (illustrated in FIG. 28) that can be covered.

A result (e.g., information indicating APs detected by the STA 13) of scan that the STA 13 executes during connection with the main anchor may be fed back to the APC 11, and APs included in the scan result may be set as sub-anchor candidates. For example, the STA 13 encapsulates a scan result (e.g., an ID for identifying an AP with a basic service set ID (BSSID) and the reception qualities of each AP) into a connection request (an association request) packet that the STA 13 is to transmit to an AP to which the STA 13 is about to connect, and transmits the resulting connection request packet to the AP. Then, the AP reports the scan result, transmitted from the STA 13, to the APC 11.

On the basis of the reported scan result, the APC 11 selects APs for sub-anchor candidates. Also, during exchange of packets (e.g., during execution of the beam selection protocol) between the AP 12-4 and the STA 13, the APC 11 may make APs in the vicinity thereof receive the packets and may select, as the sub-anchor candidates, the APs that successfully receive the packets.

Also, although the number of directional beam patterns in FIG. 5 has been described as being three, and number of directional beam patterns in FIG. 25 has been described as being eight, the present disclosure is not limited thereto. The number of directional beam patterns may also differ from one AP to another.

Also, although an example in which the APC 11 selects one sub-anchor has been described in each embodiment above, the present disclosure is not limited thereto. The APC 11 may select two or more sub-anchors. In this case, for example, the APC 11 selects, as sub-anchors, sub-anchor candidates with which the corresponding angles of the angles of the sub-anchor candidates are smaller than or equal to 90° and are larger than a determined angle (e.g., 80°).

Also, although an example in which the APC 11 selects a sub-anchor on the basis of the calculated angles has been described in each embodiment above, the present disclosure is not limited thereto. The APC 11 may also select a sub-anchor on the basis of distances between the main anchor and sub-anchor candidates. For example, when a plurality of sub-anchor candidates with which the calculated angles are equal to each other exists, the APC 11 may select, as a sub-anchor, a sub-anchor candidate that is included in the sub-anchor candidates with which the determined distances are equal to each other and that has the largest distance largest from the main anchor.

Also, although an example in which the APC 11 performs the position estimation has been described above in each embodiment, the position estimating system may have a system configuration in which an apparatus that is independent from the APC 11 may perform the position estimation.

In addition, although an example in which the arrival direction vectors are estimated based on the reception qualities obtained by executing the beam selection protocol has been described in each embodiment above, the present disclosure is not limited thereto. The arrival direction vectors may also be estimated based on the reception qualities obtained during communication different from that in the beam selection protocol.

Additionally, although an example of the configuration in which the APC 11 is included in the system as an apparatus different from APs has been described in each embodiment above, the present disclosure is not limited thereto. At least one AP may have a configuration having the functions of the APC 11.

Although some embodiments have been described above with reference to the accompanying drawings, it goes without saying that the present disclosure is not limited to such examples. It is apparent to those skilled in the art that various variations or modifications can be conceived within the scope recited in the claims, and it is to be understood that such various variations and modifications also naturally belong to the technical scope of the present disclosure. Also, the constituent elements in the above-described embodiments may also be arbitrarily combined within the scope that does not depart from the spirit of the disclosure.

Also, although, in the embodiments, the present disclosure has been described as being implemented by hardware by way of example, the present disclosure can also be realized by software in cooperation with hardware.

The above-described functional blocks described in the embodiments can typically be realized as a large-scale integration (LSI), which is an integrated circuit. The integrated circuit may control the individual functional blocks used in the description of the embodiments and may have an input and an output. The functional blocks may be individually integrated into single chips or at least one or all of the functional blocks may be integrated into a single chip. Although the functional blocks are implemented in the form of an LSI in this case, they may also be called an integrated circuit (IC), a system LSI, a super LSI, or an ultra LSI depending on a difference in the degree of integration.

The scheme for integrating the functional blocks into an integrated circuit is not limited to a scheme for LSI and may be realized using a dedicated circuit or a general-purpose processor. The functional blocks can also be implemented using a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. For example, biotechnology is applicable.

The present disclosure can also be implemented as a wireless communication apparatus or a control method to be executed by a control apparatus. The present disclosure can also be implemented by a program for causing a computer to realize the control method. In addition, the present disclosure can also be implemented as a storage medium in which such a program is stored in a computer readable manner. That is, the present disclosure can be implemented by any category of an apparatus, a device, a method, a program, and a storage medium.

Brief Summary of the Present Disclosure

A base-station control apparatus of the present disclosure is directed to a base-station control apparatus for controlling first to Mth base-station apparatuses (M is an integer greater than or equal to 2), the first base-station apparatus being connected to a wireless terminal. The base-station control apparatus includes: a sub-anchor candidate selector that selects, as one or more sub-anchor candidates, the second to Nth base-station apparatuses (N is an integer greater than or equal to 2 and is smaller than or equal to M) that are included in the second to Mth base-station apparatuses and that are present in a determined range from the first base-station apparatus; an arrival-direction estimator that obtains reception qualities of signals that the first base-station apparatus and the one or more sub-anchor candidates receive from the wireless terminal and that estimates, based on the reception qualities, an arrival direction vector with respect to the first base-station apparatus and one or more arrival direction vectors with respect to the respective one or more sub-anchor candidates; a sub-anchor selector that calculates one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates and that selects one or more sub-anchors from the one or more sub-anchor candidates based on a magnitude relationship of the one or more angles; and a position estimator that estimates a position of the wireless terminal. The arrival-direction estimator estimates a first arrival direction vector with respect to the first base-station apparatus and one or more second arrival direction vectors with respect to the selected one or more sub-anchors, and the position estimator estimates the position of the wireless terminal, based on the first arrival direction vector and the one or more second arrival direction vectors.

In the base-station control apparatus of the present disclosure, the one or more angles may include an angle made by a line indicating the first arrival direction vector and the corresponding line segment of the one or more line segments.

In the base-station control apparatus of the present disclosure, the one or more angles may include an angle made by a line indicating the arrival direction vector with respect to the corresponding sub-anchor candidate of the one or more sub-anchor candidates and the corresponding line segment of the one or more line segments.

In the base-station control apparatus of the present disclosure, the sub-anchor selector may select, as the one or more sub-anchors, the sub-anchor candidate with which an absolute value of the corresponding angle of the one or more angles is smaller than or equal to 90° and is largest of the one or more angles.

In the base-station control apparatus of the present disclosure, the sub-anchor candidate selector may set, as the determined range, a range defined by a certain distance from the first base-station apparatus, the certain distance being set based on the reception qualities of the signals that the first base-station apparatus receives from the wireless terminal.

In the base-station control apparatus of the present disclosure, the sub-anchor candidate selector may determine a directional beam pattern indicating the reception quality that is larger than or equal to a determined value, the reception quality being included in the reception qualities of the signals that the first base-station apparatus receives from the wireless terminal and may set a communication range of the determined directional beam patter as the determined range.

In the base-station control apparatus of the present disclosure, the arrival-direction estimator may estimate, as the arrival direction vector, an angle corresponding to a beam patter with which the reception quality is highest of the reception qualities of signals received using the respective beam patterns of the base-station apparatus.

A position estimation method the present disclosure is directed to a position estimation method for performing position estimation method by controlling first to Mth base-station apparatuses (M is an integer greater than or equal to 2), the first base-station apparatus being connected to a wireless terminal. The position estimation method includes: selecting, as one or more sub-anchor candidates, the second to Nth base-station apparatuses (N is an integer greater than or equal to 2 and is smaller than or equal to M) that are included in the second to Mth base-station apparatuses and that are present in a determined range from the first base-station apparatus; obtaining reception qualities of signals that the first base-station apparatus and the one or more sub-anchor candidates receive from the wireless terminal, and estimating, based on the reception qualities, an arrival direction vector with respect to the first base-station apparatus and one or more arrival direction vectors with respect to the respective one or more sub-anchor candidates; calculating one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates, and selecting one or more sub-anchors from the one or more sub-anchor candidates based on a magnitude relationship of the one or more angles; estimating a first arrival direction vector with respect to the first base-station apparatus and one or more second arrival direction vectors with respect to the selected one or more sub-anchors; and estimating a position of the wireless terminal, based on the first arrival direction vector and the one or more second arrival direction vectors.

The present disclosure is useful for wireless communication systems.

What is claimed is:

1. A base-station control apparatus for controlling first to Mth base-station apparatuses, wherein M is an integer greater than or equal to 2, the first base-station apparatus being connected to a wireless terminal, the base-station control apparatus comprising:
    a sub-anchor candidate selector that selects, as one or more sub-anchor candidates, the second to Nth base-station apparatuses, wherein N is an integer greater than or equal to 2 and is smaller than or equal to M), that are included in the second to Mth base-station apparatuses and that are present in a determined range from the first base-station apparatus, wherein the determined range is defined by a certain distance from the first base-station apparatus, the certain distance being set based on reception qualities of signals that the first base-station apparatus receives from the wireless terminal;
    an arrival-direction estimator that obtains reception qualities of signals that the first base-station apparatus and the one or more sub-anchor candidates receive from the wireless terminal and that estimates, based on the reception qualities, an arrival direction vector with respect to the first base-station apparatus and one or more arrival direction vectors with respect to the respective one or more sub-anchor candidates;
    a sub-anchor selector that calculates one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates and that selects one or more sub-anchors from the one or more sub-anchor candidates based on a magnitude relationship of the one or more angles; and
    a position estimator that estimates a position of the wireless terminal, wherein
    the arrival-direction estimator estimates a first arrival direction vector with respect to the first base-station apparatus and one or more second arrival direction vectors with respect to the selected one or more sub-anchors, and the position estimator estimates the position of the wireless terminal, based on the first arrival direction vector and the one or more second arrival direction vectors.

2. The base-station control apparatus according to claim 1,
wherein the one or more angles comprise an angle made by a line indicating the first arrival direction vector and the corresponding line segment of the one or more line segments.

3. The base-station control apparatus according to claim 1,
wherein the one or more angles comprise an angle made by a line indicating the arrival direction vector with respect to the corresponding sub-anchor candidate of the one or more sub-anchor candidates and the corresponding line segment of the one or more line segments.

4. The base-station control apparatus according to claim 1,
wherein the sub-anchor selector selects, as the one or more sub-anchors, the sub-anchor candidate with which an absolute value of the corresponding angle of the one or more angles is smaller than or equal to 90° and is largest of the one or more angles.

5. The base-station control apparatus according to claim 1,
wherein the arrival-direction estimator estimates, as the arrival direction vector, an angle corresponding to a beam pattern with which the reception quality is highest of the reception qualities of signals received using the respective beam patterns of the base-station apparatus.

6. A position estimation method for performing position estimation method by controlling first to Mth base-station apparatuses, wherein M is an integer greater than or equal to 2), the first base-station apparatus being connected to a wireless terminal, the position estimation method comprising:
selecting, as one or more sub-anchor candidates, the second to Nth base-station apparatuses, wherein N is an integer greater than or equal to 2 and is smaller than or equal to M, that are included in the second to Mth base-station apparatuses and that are present in a determined range from the first base-station apparatus, wherein the determined range is defined by a certain distance from the first base-station apparatus, the certain distance being set based on reception qualities of signals that the first base-station apparatus receives from the wireless terminal;
obtaining reception qualities of signals that the first base-station apparatus and the one or more sub-anchor candidates receive from the wireless terminal, and estimating, based on the reception qualities, an arrival direction vector with respect to the first base-station apparatus and one or more arrival direction vectors with respect to the respective one or more sub-anchor candidates;
calculating one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates, and selecting one or more sub-anchors from the one or more sub-anchor candidates based on a magnitude relationship of the one or more angles;

estimating a first arrival direction vector with respect to the first base-station apparatus and one or more second arrival direction vectors with respect to the selected one or more sub-anchors; and
estimating a position of the wireless terminal, based on the first arrival direction vector and the one or more second arrival direction vectors.

7. The position estimation method according to claim 6,
wherein the one or more angles comprise an angle made by a line indicating the first arrival direction vector and the corresponding line segment of the one or more line segments.

8. The position estimation method according to claim 6,
wherein the one or more angles comprise an angle made by a line indicating the arrival direction vector with respect to the corresponding sub-anchor candidate of the one or more sub-anchor candidates and the corresponding line segment of the one or more line segments.

9. The position estimation method according to claim 6,
wherein the calculating step includes selecting, as the one or more sub-anchors, the sub-anchor candidate with which an absolute value of the corresponding angle of the one or more angles is smaller than or equal to 90° and is largest of the one or more angles.

10. The position estimation method according to claim 6,
wherein the obtaining step includes estimating, as the arrival direction vector, an angle corresponding to a beam pattern with which the reception quality is highest of the reception qualities of signals received using the respective beam patterns of the base-station apparatus.

11. A base-station control apparatus for controlling first to Mth base-station apparatuses, wherein M is an integer greater than or equal to 2, the first base-station apparatus being connected to a wireless terminal, the base-station control apparatus comprising:
a sub-anchor candidate selector that selects, as one or more sub-anchor candidates, the second to Nth base-station apparatuses, wherein N is an integer greater than or equal to 2 and is smaller than or equal to M, that are included in the second to Mth base-station apparatuses and that are present in a determined range from the first base-station apparatus, wherein the determined range is a communication range of a directional beam pattern that indicates a reception quality larger than or equal to a predetermined value, the reception quality being one of reception qualities of signals that the first base-station apparatus receives from the wireless terminal;
an arrival-direction estimator that obtains reception qualities of signals that the first base-station apparatus and the one or more sub-anchor candidates receive from the wireless terminal and that estimates, based on the reception qualities, an arrival direction vector with respect to the first base-station apparatus and one or more arrival direction vectors with respect to the respective one or more sub-anchor candidates;
a sub-anchor selector that calculates one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates and that selects one or more sub-anchors from the one or more sub-anchor candidates based on a magnitude relationship of the one or more angles; and a position estimator that estimates a position of the wireless terminal, wherein the arrival-direction estimator estimates a first arrival direction vector with respect to the first base-station apparatus and one or more second arrival direction vectors with respect to the selected one or more sub-anchors, and the position estimator estimates the position of the wireless terminal, based on the first arrival direction vector and the one or more second arrival direction vectors.

12. A position estimation method for performing position estimation method by controlling first to Mth base-station apparatuses, wherein M is an integer greater than or equal to 2, the first base-station apparatus being connected to a wireless terminal, the position estimation method comprising:

selecting, as one or more sub-anchor candidates, the second to Nth base-station apparatuses, wherein N is an integer greater than or equal to 2 and is smaller than or equal to M, that are included in the second to Mth base-station apparatuses and that are present in a determined range from the first base-station apparatus, wherein the determined range is a communication range of a directional beam pattern that indicates a reception quality larger than or equal to a predetermined value, the reception quality being one of reception qualities of signals that the first base-station apparatus receives from the wireless terminal;

obtaining reception qualities of signals that the first base-station apparatus and the one or more sub-anchor candidates receive from the wireless terminal, and estimating, based on the reception qualities, an arrival direction vector with respect to the first base-station apparatus and one or more arrival direction vectors with respect to the respective one or more sub-anchor candidates;

calculating one or more angles made by the one or more estimated arrival direction vectors with respect to the respective one or more sub-anchor candidates and one or more line segments each having end points at a position of the first base-station apparatus and a position of the corresponding sub-anchor candidate of the one or more sub-anchor candidates, and selecting one or more sub-anchors from the one or more sub-anchor candidates based on a magnitude relationship of the one or more angles;

estimating a first arrival direction vector with respect to the first base-station apparatus and one or more second arrival direction vectors with respect to the selected one or more sub-anchors; and estimating a position of the wireless terminal, based on the first arrival direction vector and the one or more second arrival direction vectors.

\* \* \* \* \*